United States Patent [19]
Wei

[11] Patent Number: 5,953,376
[45] Date of Patent: Sep. 14, 1999

[54] PROBABILISTIC TRELLIS CODED MODULATION WITH PCM-DERIVED CONSTELLATIONS

[75] Inventor: Lee-Fang Wei, Lincroft, N.J.

[73] Assignee: Lucent Technologies Inc., Murray Hill, N.J.

[21] Appl. No.: 08/753,351

[22] Filed: Nov. 25, 1996

Related U.S. Application Data

[60] Provisional application No. 60/030,374, Nov. 5, 1996, and provisional application No. 60/026,751, Sep. 26, 1996.

[51] Int. Cl.[6] .............................. H04L 23/02; H04L 5/12
[52] U.S. Cl. ......................................... 375/265; 371/43.4
[58] Field of Search ..................................... 375/265, 254, 375/285, 261, 260, 268, 296, 298, 346, 377, 242, 341, 262; 371/43.1, 43.4, 43.6, 43.7

[56] References Cited

U.S. PATENT DOCUMENTS

| | | | |
|---|---|---|---|
| 4,831,635 | 5/1989 | Lee et al. ..................................... | 375/19 |
| 4,901,331 | 2/1990 | Calderbank et al. ...................... | 375/39 |
| 5,056,122 | 10/1991 | Wei ............................................ | 375/53 |
| 5,233,629 | 8/1993 | Paik et al. ................................... | 375/39 |
| 5,243,627 | 9/1993 | Betts et al. .................................. | 375/39 |
| 5,265,127 | 11/1993 | Betts et al. .................................. | 375/39 |
| 5,291,521 | 3/1994 | Betts et al. .................................. | 375/59 |
| 5,321,725 | 6/1994 | Paik et al. ................................... | 375/39 |
| 5,329,551 | 7/1994 | Wei ............................................. | 375/17 |
| 5,343,500 | 8/1994 | Betts et al. .................................. | 375/39 |
| 5,406,583 | 4/1995 | Dagdeviren ................................ | 375/5 |
| 5,418,798 | 5/1995 | Wei ............................................. | 371/43 |
| 5,428,646 | 6/1995 | Eyuboglu .................................... | 375/354 |
| 5,493,586 | 2/1996 | Brownlie et al. .......................... | 375/265 |
| 5,537,430 | 7/1996 | Park et al. .................................. | 371/43 |
| 5,548,615 | 8/1996 | Wei ............................................. | 375/281 |
| 5,559,561 | 9/1996 | Wei ............................................. | 348/470 |
| 5,706,312 | 1/1998 | Wei ............................................. | 375/298 |

OTHER PUBLICATIONS

Humblet et al., The Information Driveway, Institut Eurecom, Sophia–Antipolis, France, Nov. 1995.
P. A. Humblet et al. of the Institut Eurecom, Sophia–Antipolis, France, "The Information Driveway," *IEEE Communications Magazine*, 64–68 (Dec. 1996).
Lee–Fang Wei, "Trellis–Coded Modulation with Multidimensional Constellations," *IEEE Trans. on Information Theory*, pp. 483–501 (Jul. 1987).

*Primary Examiner*—Jason Chan
*Assistant Examiner*—Jean B Corrielus
*Attorney, Agent, or Firm*—Ronald D. Slusky; Jeffrey M. Weinick

[57] ABSTRACT

Signal points from a PCM-derived constellation are selected for transmission via a modulation technique which employs different levels of redundancy coding—including the possibility of no redundancy coding—for respective different sub-constellations of the overall PCM-derived constellation. The coding that is employed for at least one of the sub-constellations is carried out independently from any coding that is employed for any of the other sub-constellations. In preferred embodiments, the sub-constellations are non-overlapping portions of the overall PCM-derived constellation, the redundancy codes are trellis codes, and the trellis codes employed in conjunction with sub-constellations having increasingly smaller minimum distance between signal points provide respectively increasing amounts of decibel gain in that minimum distance in order to compensate for that increasingly smaller minimum distance.

82 Claims, 7 Drawing Sheets

(+) : EXCLUSIVE OR

T : DELAY ELEMENT OF T SECONDS, WHICH IS ENABLED WHEN THE ENCODER CONTROL SIGNAL IS "0"

(+) : EXCLUSIVE OR

T : DELAY ELEMENT OF T SECONDS, WHICH IS ENABLED WHEN THE ENCODER CONTROL SIGNAL IS "0"

| INPUT BIT PATTERN* | OUTPUT BIT PATTERN* | |
|---|---|---|
| LEADS 171 | LEADS 174 | LEADS 175 |
| 0 0 0 | 0 0 | 0 0 |
| 0 0 1 | 0 0 | 0 1 |
| 0 1 0 | 0 1 | 0 0 |
| 0 1 1 | 0 1 | 0 1 |
| 1 0 0 | 1 0 | 0 0 |
| 1 0 1 | 1 0 | 0 1 |
| 1 1 0 | 0 0 | 1 0 |
| 1 1 1 | 0 1 | 1 0 |

* READING FROM TOP TO BOTTOM IN FIG. 7

PROBABILISTIC TRELLIS CODED MODULATION WITH PCM-DERIVED CONSTELLATIONS

CROSS-REFERENCE TO RELATED APPLICATION

This application claims priority of Provisional Application Ser. No. 60/030,374 which was filed on Nov. 5, 1996; and Provisional Application Ser. No. 60/026,751 filed on Sep. 26, 1996.

BACKGROUND OF THE INVENTION

The present invention relates to the transmission of data over telecommunications networks.

The designs of virtually all of the voiceband modems which have been introduced into the marketplace to date have been based on a model of a public switched telephone network channel as being an analog channel from end to end. In such a model, one of the significant noise sources is the quantization noise introduced by so-called PCM vocoders (pulse code modulation voice coders). In particular, in an originating central office, the PCM vocoder converts input analog signals, such as voice signals or analog voiceband data signals (such as QAM signals), into digital form for transmission across digital facilities within the core of the network. At the terminating central office, a matching vocoder reconverts those signals back into analog form. The quantization noise arises from the fact that when the input signal is sampled just prior to quantization, its amplitude is almost never exactly equal to any of the vocoder's pre-defined quantization levels. Thus what gets transmitted is the quantization level that is closest to the actual signal amplitude—actually an (illustratively) 8-bit word which represents that level. The discrepancy between the actual amplitude and the transmitted representation of that amplitude appears in the receiving modem as the form of noise referred to as quantization noise.

Noise in a channel is an important consideration in the design of a modem—more particularly the design of its signaling and modulation formats—because power constraints imposed by the network on signals applied thereto, combined with the assumed worst-case level of noise give rise, in turn, to a particular worst-case signal-to-noise ratio (SNR) that must be assumed to exist SNR, in turn, is one of the two principal factors which limit the rate at which data can be transmitted over a channel, bandwidth being the other.

Various techniques, including quadrature-amplitude modulation, trellis coding, echo cancellation, and adaptive equalization developed over the last two decades have allowed modem data rates to progress, even in the face of the network's SNR and bandwidth constraints, from about 2.4 kilobits per second (kbps) in the early 1980s to rates in excess of 30 kbps today. Moreover, U.S. Pat. No. 5,406,583 issued Apr. 11, 1995 to N. Dagdeviren, hereby incorporated by reference, teaches that one can completely eliminate the vocoder quantization noise as a source of impairment in the overall channel—and thereby yet further increase the data rates achievable over a public switched telephone network channel—by encoding the data bits to be transmitted using the codes which represent the vocoders' quantization levels and delivering those codes to the network in their digital form. By thus matching the amplitudes of the transmitted signal—actually represented by an 8-bit word—to the pre-defined quantization levels of the vocoder, the receiving vocoder's analog output amplitude is an exact, rather than an approximated, representation of the input amplitude. In essence, this approach implements a modulated signaling scheme based on a constellation of signal points derived from the quantization levels of the vocoder. Such a constellation is herein referred to as a "PCM-derived constellation."

SUMMARY OF THE INVENTION

It is well known in the voiceband modem arena that if one is willing to suffer some additional implementational complexity and transmission delay, one can apply channel coding techniques such as trellis coded modulation (TCM) to an existing signaling scheme in order to achieve so-called coding gain which, in turn, allows for the transmission of data at higher rates with an equivalent level of performance. I have carried out calculations, however, which show that straightforward implementation of most trellis coded modulation schemes with a PCM-derived constellation may provide little or no coding gain. This is due to the fact that vocoders universally used within the telecommunications industry have a non-linear quantization characteristic; proportionately more of the (typically) 256 available quantization levels are used to encode the relatively low-amplitude portions of the waveform being encoded than are used for the relatively high-amplitude. And as explained in further detail hereinbelow, this non-linear characteristic, in turn, may cause such a large reduction in the minimum distance between the points of the PCM-derived constellation, depending on the constellation sizes involved that any advantage that would be achieved by the trellis code itself is almost completely wiped out.

I have, however, discovered how to use trellis coded modulation with a PCM-derived constellation in a way which achieves significant coding gain.

In accordance with the invention, signal points from the PCM-derived constellation are selected for transmission via a modulation technique which employs different levels of redundancy coding—including the possibility of no redundancy coding—for respective different sub-constellations of the overall PCM-derived constellation. The coding that is employed for at least one of the sub-constellations is carried out independently from any coding that is employed for any of the other sub-constellations. In preferred embodiments, the sub-constellations are non-overlapping portions of the overall PCM-derived constellation, the redundancy codes are trellis codes, and the trellis codes employed in conjunction with sub-constellations having increasingly smaller minimum distance between signal points provide respectively increasing amounts of decibel gain in that minimum distance in order to compensate for that increasingly smaller minimum distance.

In the illustrative embodiments explicitly disclosed herein, the PCM-derived constellation is divided into two sub-constellations—called the inner and outer sub-constellations, with the minimum distance of the inner sub-constellation being smaller than that of the outer sub-constellation. A selected trellis code is used for the inner sub-constellation and no trellis coding is used for the outer sub-constellation.

The invention, overall, increases the so-called effective minimum distance between the signal points of the PCM-derived constellation as a whole for a given data rate and a given average power constraint and thus allows for an increase in the data rate over that previously achievable with an equivalent level of performance.

The notion of utilizing inner and outer sub-constellations in the PCM-derived constellation context does seem to be described in the paper entitled "The Information Driveway" by P. A. Humblet and J. G. Troulis of the Institut Eurecom, Sophia-Antipolis, France and bearing a date of Nov. 30, 1995, which was posted on the Internet. It is not known to me when this document became publicly available. In any event, in the coding scheme described by Humblet et al, a single trellis code is used in the process of selecting signal points from both of the sub-constellations in an interdependent manner, rather than in an independent manner for at least one of the sub-constellations pursuant to the present invention. Certain aspects of how Humblet et al would actually implement their scheme in a practical way are not clear from their paper, nor is it clear that the results claimed for their scheme in terms of error performance are correct. Accordingly, I herein compare the performance of the inventive approach to the other prior art arrangements described hereinabove rather than to Humblet et al.

DETAILED DESCRIPTION

Figure 1:
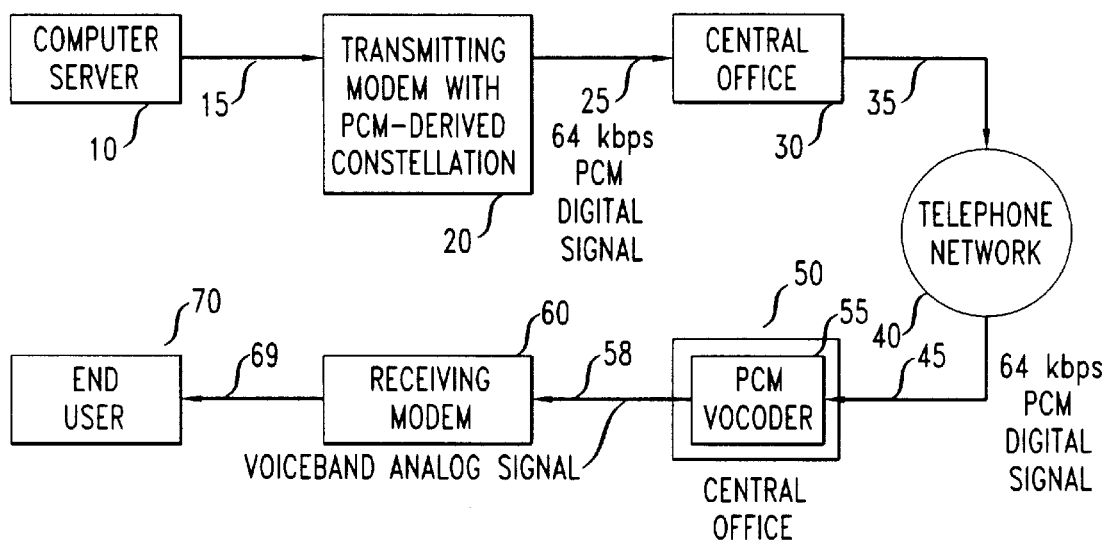
FIG. 1 is a block diagram of a telecommunications system embodying the principles of the present invention.

In the telecommunications system of FIG. 1, data bits provided on line 15 by a computer server 10 are transmitted at, illustratively, a rate of 56 kilobits per second (kbps), to an end user terminal 70. Illustratively, data bits are communicated in the other direction—from end-user terminal 70 to server 10—at a significantly lower data rate, consistent with such applications as World Wide Web access wherein server-to-user communications need to be at a relatively high rate in order to transmit graphical information whereas user-to-server communications—typically representing individual alphabetic characters, "mouse clicks" and the like—can be at a much lower rate. For clarity of presentation, the latter, "upstream," communications are not represented in FIG. 1. A discussion of upstream communications appears at the end of this detailed description.

Figure 2:
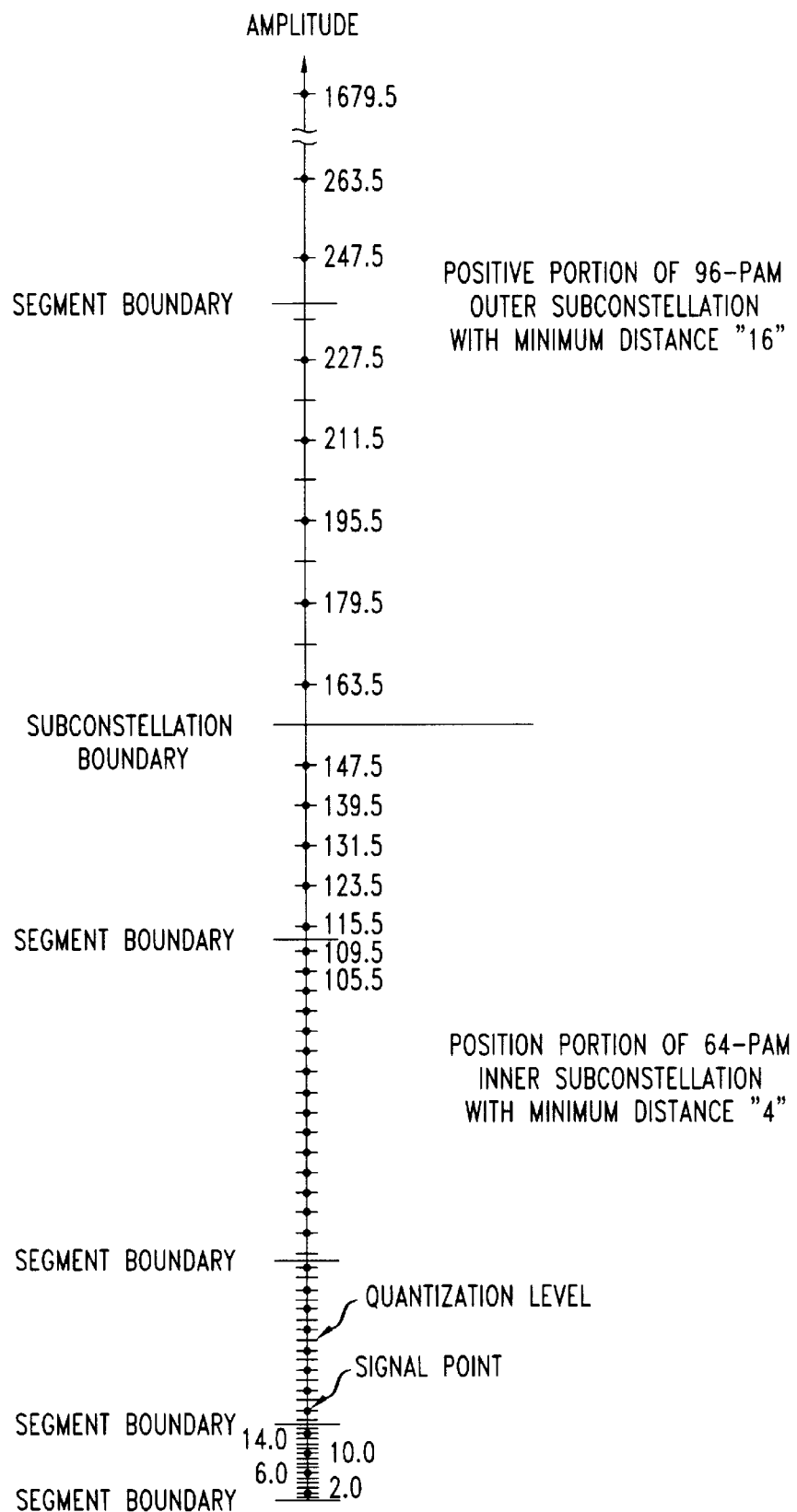
FIG. 2 shows how an illustrative PCM-derived signal constellation used in accordance with the invention is derived from conventional PCM vocoder quantization levels.

The 56 kbps output of server 10 is applied to a transmitting modem 20 which is typically co-located with the server. In turn, the output of modem 20 is applied to near-end central office 30. Unlike conventional, voiceband modems, the output of modem 20 is not a modulated carrier signal but, rather, a digital signal which is communicated to central office 30 over a digital line 25. The digital signal on line 25 comprises a sequence of 8-bit words, with each different combination of 8-bit word values representing a respective signal point of a predefined signal constellation. Pursuant to the generic teachings of the above-cited '583 patent, the points of that constellation comprise a selected subset of the quantization levels of a conventional mu-law or A-law vocoder. Such a constellation, herein referred to as a "PCM-derived constellation," is shown in FIG. 2 and Appendix I and is discussed in detail below. Although the output data rate of computer server 10 is 56 kilobits per second (bps), the output data rate of modem 20 is 64 kbps, consistent with the conventional PCM digital signal format. The manner in which the 56 kbps signal becomes a 64 kbps signal will become clear as this description continues.

Significantly, since the 64 kbps signal received by central office 30 is already in PCM format, it is not subjected to any quantization or other processing that is applied, for example, to analog voice signals that may also be received by central office 30. Rather, the PCM-formatted signal received from line 25, extended over trunk 35, telephone network 40, and trunk 45 to far end central office 50, is transmitted in PCM form.

Although the signal generated by modem 20 is a digital signal, the overall connection between server 10 and end user terminal 70 is not fully digital. Rather, the signal as applied to far-end central office 50 is indistinguishable—from the perspective of central office 50—from any other 64 kbps PCM-encoded signal that may be communicated to it, such as an encoded voice signal or conventional voiceband modem signal. That is, central office 30 applies the signal that originated from modem 20 to a conventional PCM channel. Thus when that signal arrives at far-end central office 50, it is applied to a PCM vocoder 55 just like all the other PCM-encoded signals that arrive at central office 50. The output of PCM vocoder 55 is thus a voiceband analog signal occupying a bandwidth of (typically) 3.5 kHz. That signal is transmitted to the user premises over analog local loop 58.

At the user premises, a receiving modem 60 demodulates and decodes the received voiceband analog signal—representing transmitted signal points of the PCM-derived constellation—consistent with the manner in which those signal points were generated in modem 20. The resulting 56 kbps output bit stream on lead 69 is then presented to end user terminal 70, which is illustratively a subscriber's personal computer.

The nature of the PCM-derived signal constellation can be understood from a consideration of FIG. 2. The mu- or A-law quantization used in conventional PCM encoding employs 255 or 256 quantization levels, and what is represented in FIG. 2 are 128 non-negative quantization levels of a mu-law encoder, represented by the short cross bars. These quantization levels are divided into eight segments each having 16 equally spaced quantization levels as demarcated by the longer cross bars marked "segment boundary". The amplitude range of each of the eight segments is approximately double that of the next-lower-in-amplitude segment. Thus the distance between quantization levels within a segment increases for each successive segment. This scheme thus provides logarithmic compression of the analog signals to be quantized. As a consequence of the aforementioned doubling, and the consequent wide spacing between the quantization levels of the higher-amplitude segments, it is inconvenient to explicitly show to scale all 128 quantization levels in the drawing. Rather, FIG. 2 shows explicitly all of the quantization levels of only the first four segments and a few of the other quantization levels. The mu-law encoder also includes 127 negative quantization levels, which are arranged in mirror image to that of the positive quantization levels.

The signal points of the PCM-derived signal constellation comprise selected ones of the PCM quantization levels, thereby, advantageously, eliminating PCM quantization noise as a source of noise in the overall system, as described above. The particular signal points comprising the PCM-derived signal constellation used by modems 20 and 60 are represented as dots in FIG. 2. There are 80 positive-valued signal points but, again, because of the aforementioned wide spacing, it is not practical to show in FIG. 2 all of the 80 signal points explicitly. The PCM-derived constellation also contains 80 negatively-valued signal points in the mirror image. The exact amplitude levels of all 160 signal points of this illustrative PCM-derived constellation (along with the scheme by which the data to be coded is represented by those signal points, as explained below) are shown in Appendix I.

The conventional approach to selecting the signal points of a PCM-derived constellation—assuming a given number of points in the signal constellation in order to achieve a desired overall data bit rate—would be to choose ones of the quantization levels a) that are as equally spaced as possible and, b) for which the minimum distance between the levels is as large as possible consistent with the network's peak and average power constraints. The minimum distance criterion, in particular, is a critical design parameter because the transmitted signal points, when they traverse local loop 58, are inevitably displaced in signal space by channel noise and other channel impairments. Thus the extent to which a transmitted signal point may be erroneously detected at receiving modem 60 depends on how "far away" the transmitted signal point is from its nearest neighbors in the PCM-derived constellation. Such a scheme will achieve a certain expected level of error rate performance which may be adequate for particular applications. If a higher level of error rate performance is required, it is well known in the voiceband modem arena, as noted above, that if one is willing to suffer some additional implementational complexity and transmission delay, one can apply channel coding techniques such as trellis coded modulation (TCM) to an existing signaling scheme in order to achieve an effective minimum distance between the constellation signal points which is greater than the actual, i.e., Euclidian minimum distance between the signal points which, in turn, allows for even higher rates with an equivalent level of performance. I have carried out calculations, however, which show that straightforward implementation of most trellis coded modulation schemes with a PCM-derived constellation may provide little or no increase in the effective minimum distance between the signal points. This is due to the logarithmic nature of the PCM encoding scheme. In particular, implementing a trellis coded modulation scheme involves expanding the required number of signal points in the constellation over an uncoded case. Moreover, the process of maximizing the actual minimum distance between the signal points means, at least for larger constellations, that all of the higher-amplitude signal points of the signal constellation are taken from adjacent ones of the PCM quantization levels. (Whenever we speak herein about high and low signal point amplitudes or quantization level amplitudes, this should be understood to be referring to the absolute value of the quantity in question.) This means that the needed additional signal points must be taken from the lower amplitude quantization levels. This, in turn, reduces the actual minimum distance between the signal points, and it turns out that that reduction in the actual minimum distance between the signal points is such that any advantage that would be achieved by the trellis code itself is almost completely wiped out. That is, the effective minimum distance of the expanded constellation is substantially the same as the actual minimum distance of the original, unexpanded constellation.

I have, however, discovered how to use trellis coded modulation with a PCM-derived constellation in a way which achieves significantly increased effective minimum distance for the constellation.

Considering first the particular case of the illustrative embodiment, this is achieved by dividing the PCM-derived constellation into two sub-constellations—called the inner and outer sub-constellations. The boundary between the inner and outer sub-constellations is shown graphically in FIG. 2 as well as in Appendix I. As can be seen from the latter, the inner sub-constellation illustratively comprises 64 signal points with an actual minimum distance of "4," that minimum distance being, for example, the distance between the signal points whose amplitudes are "−2" and "+2". (It is assumed herein that the minimum distance between the PCM vocoder quantization levels has a normalized value of "1".) The outer sub-constellation comprises 96 points and the actual minimum distance of that constellation is "16," such as the distance between the points whose amplitudes are "163.5" and "179.5". The actual minimum distance of the inner sub-constellation is smaller than that of the outer sub-constellation so that if nothing else were to be done, the minimum distance of the overall constellation would be "4" which would determine the overall performance of the constellation. However, a selected trellis code is used in conjunction with the inner sub-constellation, while a lesser level of trellis coding—in this example, in fact, no trellis coding whatsoever—is used for the outer sub-constellation. Thus while the minimum distance of the outer sub-constellation remains at "16," the trellis coding causes the effective minimum distance of the inner sub-constellation,—and thus the effective minimum distance of the constellation as a whole—to be significantly increased from "4."

More specifically, the "effective minimum distance," of a constellation (or, in this case, sub-constellation), is given by the square root of the minimum sum of the squared Euclidian distance between each pair of signal points in any two valid signal point sequences. Not every sequence of signal points is valid in a trellis-coded system, which is what gives rise to its enhanced immunity to channel impairments. In the typical uncoded system, by contrast, every sequence of signal points is valid, in which case the effective minimum distance of the constellation is the same as its actual minimum distance, i.e., the minimum Euclidian distance between any two signal points of the constellation. See, for example, "Trellis-Coded Modulation with Multidimensional Constellations," *IEEE Trans. on Information Theory,* pp. 483–501 (July 1987), wherein the parameter referred to herein as the "effective minimum distance" is the same as the square root of what is referred to therein as the "minimum squared Euclidian distance between any two valid sequences of signal points."

The increase in the minimum distance of a sub-constellation from its actual to its effective minimum distance can be expressed as a nominal decibel gain, given by $20 \log_{10}$(effective minimum distance/actual minimum distance), that parameter thus being a measure of the improvement in error immunity that results from the trellis code. (The true decibel gain is less than the nominal decibel gain due to the effect of a larger error coefficient that usually associated with the code. In the present embodiments, for example, there is a 0.5 dB difference between the nominal and true decibel gains. For purposes of this invention, the term "decibel gain" can be understood to refer to either the true or nominal decibel gain.)

In this embodiment, the effective minimum distance of the inner sub-constellation is "15", as compared to an actual minimum distance of "4", yielding a nominal decibel gain of 11.5 dB.

In preferred embodiments, the effective minimum distance of the inner sub-constellation is made equal, or as nearly equal as practical, to the effective minimum distance of the outer sub-constellation. Using the particular trellis code employed in the present illustrative embodiment, as described in detail hereinbelow, the effective minimum distance of the inner sub-constellation is, as just noted, "15," as compared to the effective minimum distance (=actual minimum distance) of "16" for the outer sub-constellation. This is a better result than is achieved by the prior art, either without using any trellis coded modulation, or using trellis coded modulation across the entire PCM-derived constellation, as would be prescribed by prior art practice, as is detailed at a more opportune point hereinbelow.

(It should be noted as a further implementational detail that the minimum distance between the sub-constellations should ideally be no less than the smallest of the effective minimum distances of the various sub-constellations. This is because what ultimately determines performance here is the effective minimum distance of the overall PCM-derived constellation, which is the minimum of i) the effective minimum distances between of the signal points of the various sub-constellations and ii) the minimum distances between the various sub-constellations themselves. This criterion is met in the present illustrative embodiment, in that the minimum distance between the inner and outer sub-constellations is the distance between the points whose amplitudes are "147.5" and "163.5," namely "16" (>"15").)

More generally in accordance with the invention, there may be any desired number of sub-constellations, which are preferably non-overlapping. That is, none of the sub-constellations has a signal point whose amplitude falls between the amplitudes of a pair of signal points of any other sub-constellation. Alternatively stated for the case of two sub-constellations, the signal points of the first sub-constellation are all of lower amplitude than any of the signal points of the second sub-constellation. Different levels of redundancy coding—including the possibility of no redundancy coding are employed—for respective different sub-constellations of the overall PCM-derived constellation. The redundancy coding is illustratively trellis coding. The trellis codes employed in conjunction with sub-constellations having increasingly smaller minimum distance between signal points provide respectively increasing amounts of decibel gain in order to compensate for that increasingly smaller minimum distance thereby increasing the effective minimum distance to an appropriate degree for each sub-constellation. Thus in the illustrative embodiment, for example, the inner sub-constellation, since it has the smaller actual minimum distance of "4," is provided with greater decibel gain than the outer sub-constellation.

The invention, overall, increases the effective minimum distance between the signal points of the PCM-derived constellation as a whole for a given data rate and a given average power constraint and thus allows for an increase in the data rate over that previously achievable with an equivalent level of performance.

Figure 3:
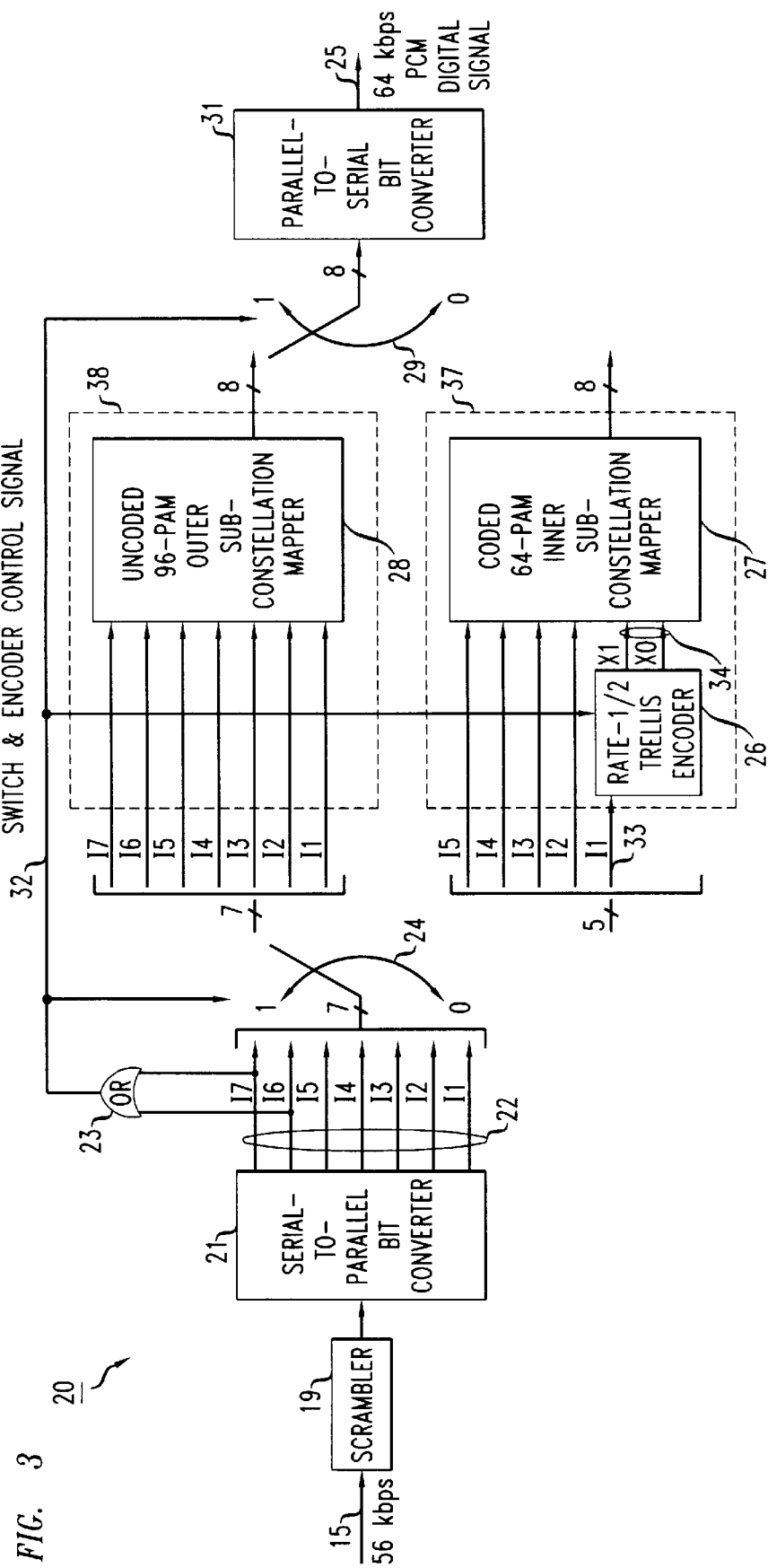
FIG. 3 is a block diagram of first illustrative embodiment for the transmitting modem used in the telecommunications system of FIG. 1.

A first illustrative embodiment of modem 20 is shown in FIG. 3. In particular, scrambler 19 thereof subjects the serial stream of 56 kbps data on line 15 to a conventional scrambling (also called randomizing) operation and the resultant scrambled bit stream is converted to a sequence of N-bit words by serial-to-parallel bit converter 21 illustratively, N=7. The seven bits of each word, denominated I1, I2, ... I7, are provided in parallel on leads 22 at a rate of 1/T per second, where T is the so-called signaling interval whose value is dictated by the PCM signaling format. In particular, T=0.125 msec, so that the so-called symbol rate, more commonly called the baud rate, is $1/(0.125 \times 10^{-3}) = 8 \times 10^3$ symbols per second, or 8 kbaud.

Various different ones of the input bit patterns are steered to respective modulators for the various sub-constellations of the PCM-derived constellation. Thus in this embodiment, when certain bit patterns appear on leads 22, the inner sub-constellation is used. In this case, lead 22 bits are steered by a switch 24 to a coded modulator 37 comprising rate ½ trellis encoder 26 and inner sub-constellation mapper 27, causing a stream of signal points of the inner sub-constellation to be identified at the output of mapper 27. When the other bit patterns appear on leads 22, the outer sub-constellation is used. In this case, lead 22 bits are steered to an uncoded modulator 38 comprising outer sub-constellation mapper 28, causing a stream of signal points of the outer sub-constellation to be identified at the output of mapper 28. The outputs of mappers 27 and 28 are 8-bit words each representing the PCM quantization level from which the corresponding signal point was derived. These are applied to parallel-to-serial bit converter 31 and thence onto trunk 25 by way of switch 29, which is controlled in tandem with switch 24. Parallel-to-serial bit converter 31 generates a transmit an output signal representing the selected signal points. That signal is applied to trunk 25. The bits carried by that output signal are at a rate of 64 kbps (=8 bits×8 kbaud).

More particularly, the bit patterns on leads 22 which are to be represented using the inner sub-constellation are those which meet a predetermined criterion, which illustratively are those bit patterns which, at $q \geq 1$ predetermined bit positions have particular values. In this embodiment it is those bit patterns whose values of I6 and I7 are both "0", those bits being referred to herein as the "steering bits" since their values determine which modulator the input bits are steered to. In that case, bits I1 through I5 are applied by switch 24 to coded modulator 37 for ultimate identification of a signal point from the inner sub-constellation. (There is no need to apply bits I6 and I7 to coded modulator 37; the fact that a signal point from the inner sub-constellation was received is used at the receiver to reconstruct the values of those bits—namely "0" for each.) Coded modulator 37 is of standard design in which a first group of k bits—in this case comprising the single bit I1—is applied to input lead 33 of trellis encoder 26. The bit output of the latter on leads 34, comprises p>k bits. Illustratively, p=2. Thus bits X0 and X1 are applied to constellation mapper 27, while bits I2 through I5 are applied to constellation mapper 27 directly. Each different one of the 64 possible bit patterns at the input of constellation mapper 27 identifies one of the 64 signal points of the inner sub-constellation, the specific illustrative mapping being shown in Appendix I and being described in further detail hereinbelow.

By contrast, the bit patterns on leads 22 which are to be represented using the outer sub-constellation are those which do not meet the aforementioned criterion, that is those whose values of bits I6 and I7 are not both "0". That is, they are one of the three bit-pair values, "01," "10" or "11". In that case, bits I1 through I7 are applied by switch 24 to uncoded modulator 28 for ultimate identification of a signal point from the outer sub-constellation. Since bits I6 and I7 never take on the value "00" when applied to modulator 28, it can be verified that there are 96 possible bit patterns at the input of constellation mapper 28, each of those patterns identifying one of the 96 signal points of the outer sub-constellation, again, shown in detail in Appendix I.

The above-described steering of the bits on leads 22 to one of the two modulators is achieved by using the Boolean OR function of bits I6 and I7 as provided on control lead 32 by OR gate 23 to operate switches 24 and 29 in order to appropriately steer the outputs of modulators 37 and 38 to converter 31. The signal on lead 32 also controls the operation of trellis encoder 26 in the sense that the so-called state of the trellis encoder—which is illustratively implemented as a finite state machine—is advanced in response to the signals on its input lead only when switch 24 is in the "down" position and is therefore providing a new value of bit I1 at the input of the trellis encoder.

The effective minimum distance of "15" for the overall PCM-derived constellation achieved in this embodiment of the invention is to be compared to the effective minimum distance that is achieved in accordance with prior art practice at the same data rate of 56 kbps. In particular, encoding the 7 bits per baud in order to support a 56 kbps bit stream without any trellis coded modulation would require a $2^7=128$-point PCM-derived constellation. The best such constellation would have an actual and effective minimum distance of "8." The invention thus secures a significantly higher level of error rate performance than such a prior art arrangement—5 dB higher at the 56 kbps rate. Moreover, using trellis coded modulation of the kind of coded modulator 37 across the entire PCM-derived constellation, as would be prescribed by prior art practice, makes the performance worse, rather than better. In particular, the 7 bits to be encoded for each baud would be expanded to 8 bits due to the redundant bit introduced by the trellis encoder for each signaling interval, giving rise to the need for a $2^8=256$-point PCM-derived constellation. This means that every one of the 256 mu-law quantization levels would have to be used for the PCM-derived constellation which, in turn, would mean that at least the telephone network's average power constraint would be violated due to the frequent occurrence in the signal stream of many high-amplitude points. In addition, the actual minimum distance of such a constellation would be "1,"resulting, after trellis coding, in an effective minimum distance of 3.75—which is even worse than the effective minimum distance of "8" that is achieved if no trellis coded modulation were used at all!

Figure 4:
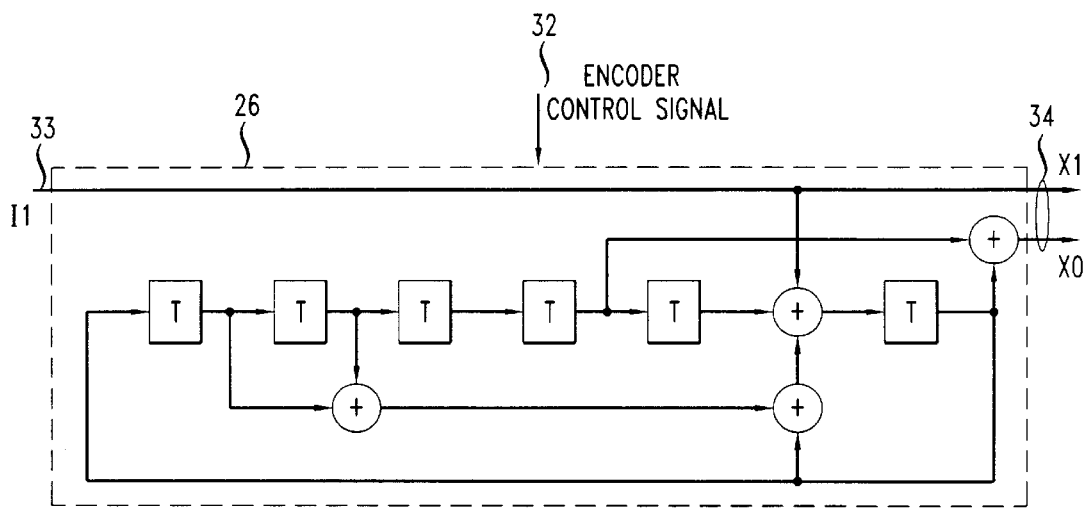
FIGS. 4 and 5 show respective different illustrative embodiments for a trellis encoder used in the modem of FIG. 3.
Figure 5:
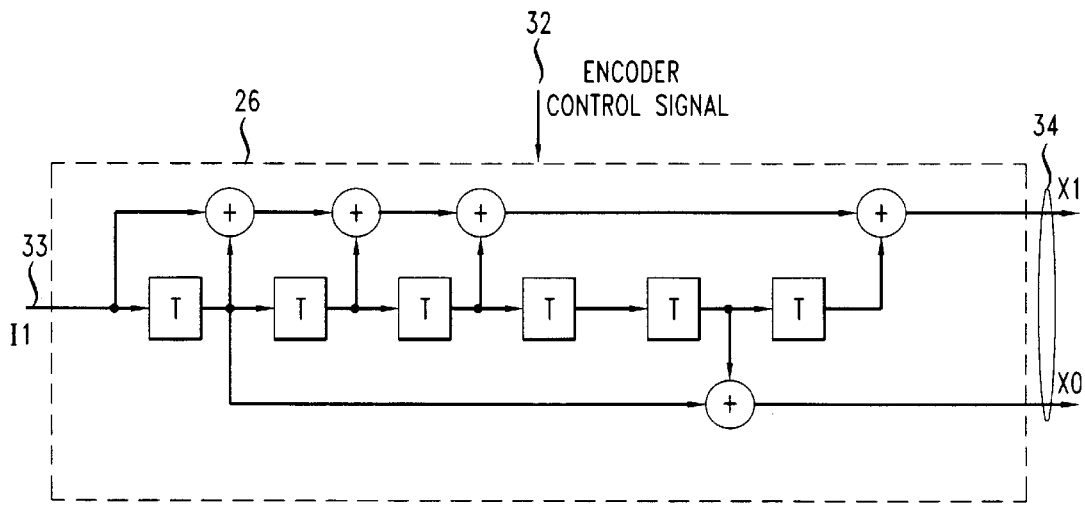

FIGS. 4 and 5 show respective different illustrative embodiments of finite state machines for implementing trellis encoder 26. These two embodiments are based on the same trellis, and the code which they implement have identical distance metrics and yield the same performance. In either case the codes are designed in conjunction with the distance properties of the inner sub-constellation following known design methodologies.

Choosing between which of the encoders of FIGS. 4 and 5 to use is, for the most part, a matter of design choice. In particular, the trellis encoder of FIG. 4 is a systematic encoder—so-called because its input bit stream on lead 33 is carried directly to the encoder output as one of its output bits X1 on one of leads 34. Voiceband modem designers often prefer to use a systematic code because it is possible, should it be desired for any reason, to recover the transmitted bit(s) that were applied to the trellis encoder without carrying out any decoding in the receiver (albeit without thereby realizing the enhanced noise immunity afforded by the use of the code in the first place). The other one of leads 34 carries redundant bit X0, which is generated by the logic circuit shown in the figure comprised of six T-second delay elements and four exclusive-OR gates, where T is the aforementioned signaling interval. As noted earlier, the operation of the trellis encoder 26 is controlled by the signal on lead 32 in the sense that its state—given by the contents of its six delay elements—is changed in response to the signals on input lead 33 only when switch 24 of FIG. 3 is in the "down" position and is therefore providing a new value of bit I1 at the input of the trellis encoder.

By contrast, the trellis encoder embodiment shown in FIG. 5 implements a non-systematic code, meaning that, unlike the case of FIG. 4, neither of the bit streams on output leads 34 in the FIG. 5 embodiment is a replica of the input bit stream on lead 33. It can be seen from an inspection of the logic circuit which implements the trellis coder of FIG. 5 that the values of the bits in its delay elements are the six previous values of input bit I1. This provides the advantage that it is guaranteed that the code can be "terminated" following the teachings of my co-pending provisional U.S. patent application cited below. (Although not guaranteed, it may also be possible to rapidly terminate the code implemented by the trellis encoder of FIG. 4.) Terminating the code may be desirable in the embodiments disclosed herein, as described at a more opportune point hereinbelow.

Appendix I shows one illustrative way in which the bits applied to constellation mappers 27 and 28 are mapped into signal points of the PCM-derived constellation. When mapped by constellation mapper 28 into signal points of the outer sub-constellation, the various combinations of the values of the bits I1, I2, I3, I4, I5, I6 and I7 can be assigned to the signal points in any convenient way. In preferred embodiments, however, Gray coding is used, such that that the bit pattern associated with a given signal point differs from the overall bit pattern associated with the next-closest signal point in only one bit position. If an error is made in the receiver as to which signal point of the outer sub-constellation was transmitted, the identified erroneous signal point is most likely to be one of the nearest neighbors of the signal point that was actually transmitted. Thus, advantageously, the erroneously recovered bit pattern will differ in only one bit position from that which was transmitted. Thus, for example, the bit pattern associated with the signal point whose amplitude is "1615.5"—namely the bit pattern 0101011—differs in the 6th (5th) bit position from the bit pattern associated with its nearest neighbor whose amplitude is "1679.5" ("1551.5"). (Such a one-bit error might possibly be able to be corrected by any forward error correcting scheme that might be implemented by the protocol which governs the communications between server 10 and terminal 10.)

As to the manner in which the values of the bits X0, X1, I2, I3, I4 and I5 are mapped by constellation mapper 27 into signal points of the inner sub-constellation, it should first be noted that although the values of bits I6 and I7 are shown explicitly in Appendix I, their values, which are always "0", are not used to select a signal point from the inner sub-constellation. Rather, the values of those bits are implicitly conveyed to the receiver by virtue of transmitting an inner sub-constellation signal point, as noted above. Thus the values of bits I6 and I7 are reconstructed in the receiver as both being "0" whenever the receiver determines that an inner sub-constellation point has been received. Looking at the arrangement of the other bit patterns associated with the inner sub-constellation, it is to be observed that pursuant to conventional trellis coded modulation, the signal points thereof are divided into, illustratively, four subsets with the signal points of each subset having the same value of bits X0 and X1. Thus the signal points having X0=X1="0" belong to one subset; those having X0="0" and X1="1" belong to another subset and so forth. Following conventional design criteria, the minimum distance of each subset is maximized and is greater than the minimum distance of the overall inner sub-constellation. The bits I2, I3, I4 and I5 identify a particular signal point within the subset identified by bits X0 and X1. Gray coding is also utilized vis-a-vis the inner sub-constellation, but only with respect to the points within a given subset. Thus, for example, within the subset for which X0=X1="0", the bit pattern associated with the signal point whose amplitude is "101.5"—namely the bit pattern 010100—differs only in the 4th (3rd) bit position from the bit pattern associated with its nearest neighbor within the subset whose amplitude is "123.5" ("85.5").

Gray coding is also used as between the signal points at the boundaries points between the inner and outer sub-constellations, at plus/minus"163.5" and plus/minus "147.5".

Figure 6:
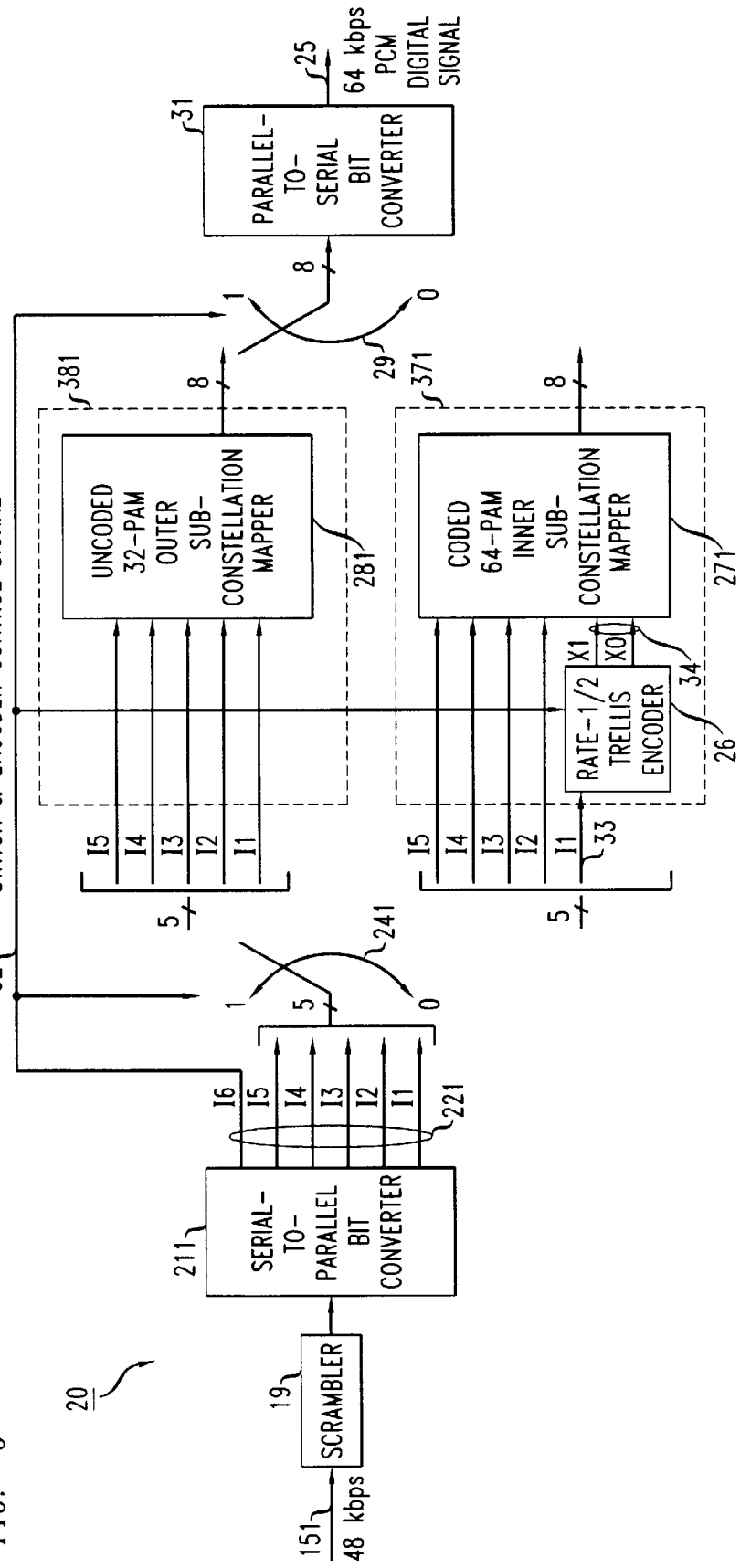
FIGS. 6 and 7 show respective alternative embodiments for the transmitting modem used in the telecommunications system of FIG. 1.

An alternative embodiment of modem 20, shown in FIG. 6, achieves significantly better level of error rate performance than that of FIG. 3 at a cost of reduced data rate. In particular, the embodiment of FIG. 6 provides an additional 12 dB of noise immunity at a data rate of 48 kbps. This embodiment is very similar to that shown in FIG. 3 with but a few modifications, as will now be discussed. Firstly, a different PCM-derived constellation, shown in Appendix II, is used, with its signal points being taken from different ones of the PCM quantization levels than were used for the constellation of Appendix I. In this second constellation, the inner sub-constellation again has 64 signal points, but their minimum distance is greater than before, it being "16" rather than "4". The outer sub-constellation has only 32 signal points. Its minimum distance is also greater than before, it being "64" rather than "16." The trellis coding provides an effective minimum distance for the inner sub-constellation of "60," which, as desired, is very close to that of the outer sub-constellation. Again, the bits are Gray-coded. The average power of this second PCM-derived constellation is actually slightly greater than the allowed maximum average power defined for the North American public switched telephone network. A violation of such small magnitude may be acceptable. If not, one could judiciously adjust some of the signal points of the PCM-derived constellation to slightly lower quantization levels in such a way as to bring the PCM-derived constellation to strictly within the allowed limit while only minimally affecting performance.

Looking at the differences between the implementations shown in FIGS. 3 and 6, it will be seen that, as noted above, the rate of the data bits on line 15 is 48 kbps rather than 56 kbps. In addition, each word on leads 221 at the output of serial-to-parallel bit converter 211 comprises N=6 bits rather than 7. Only one steering bit is used, it being bit I6. When its value is "0" bits I1 through I5 are steered to coded modulator 371 for ultimate identification of a signal point from the inner sub-constellation. When its value is "1" bits I1 through I5 are steered to uncoded modulator 381 for ultimate identification of a signal point from the outer sub-constellation.

Figure 7:
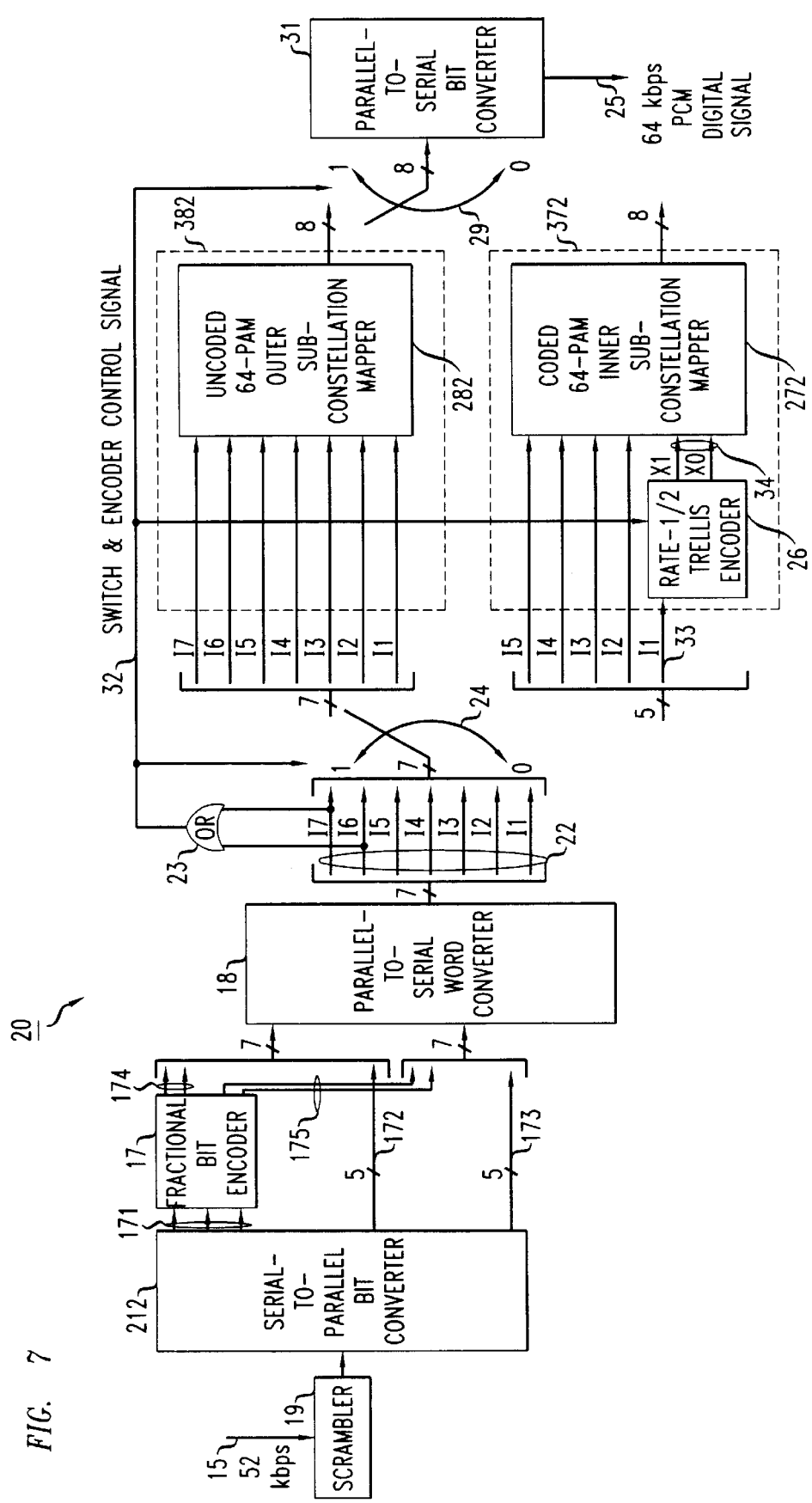

Although the embodiment of FIG. 6 provides a very large improvement in error rate performance, that improvement may be more than is needed in a given situation, while a full 8 kbps of data rate will have been sacrificed in the process. The embodiment of FIG. 7 provides a middle ground whereby 6 dB of error rate improvement over the embodiment of FIG. 3 is achieved at a reduction of only 4 kbps of data rate. Indeed, all three embodiments can be designed into a single modem whose highest bit rate is 56 kbps, but with the embodiments of FIGS. 7 and 6 being able to be brought into play in order to support so-called fallback rates of 52 and 48 kbps, respectively.

The embodiment of FIG. 7 is, again, very similar to that shown in FIG. 3 with but a few modifications. Indeed, the similarity among the three embodiments permits the above-suggested combining of them into a single modem to be carried out easily and cost-effectively. The constellation for the embodiment of FIG. 7 is shown in Appendix III. The inner sub-constellation still has 64 signal points, with a minimum distance of "8". The outer sub-constellation also has 64 signal points, with a minimum distance of "32". The trellis coding provides an effective minimum distance for the inner sub-constellation of "30." And, again, the bits are Gray-coded. (As discussed below, the rate of 52 kbps gives rise to the use of so-called fractional bit rate coding within the transmitter which, in this embodiment, has given rise to a Gray coding violation between the signal points at amplitudes plus/minus "799.5" and plus/minus "831.5". This minor deviation will have an almost negligible effect on overall performance and is not of practical concern.)

Looking at the differences between the implementations shown in FIGS. 3 and 7, it will be seen that, as noted above, the rate of the data bits on line 15 is 52 kbps. This is equivalent to a fractional bit rate of 6.5 bits per signaling interval, as compared to the integral bit rates of 7 and 6 bits per signaling interval provided by the embodiments of FIGS. 3 and 6, respectively.

In order to accommodate this fractional bit rate, 13 bits are collected over each pair of signaling intervals and provided in parallel form at the output of serial-to-parallel bit converter 212—3 bits on leads 171, 5 bits on leads 172 and another 5 bits on leads 173. The 3 bits on leads 171, in turn, are processed by fractional bit encoder 17 in order to generate two 2-bit words on leads 174 and 175, respectively, pursuant to the conversion table shown in FIG. 8. Parallel-to-serial word converter 18 combines the two bits on leads 174 with the 5 bits on leads 172 to provide a first N=7-bit word on leads 22 associated with the first signaling interval of each signaling interval pair and thereafter combines the two bits on leads 175 with the 5 bits on leads 173 to provide a second N=7-bit word on leads 22 associated with the second signaling interval of each signaling interval pair.

Figures 8, 9:
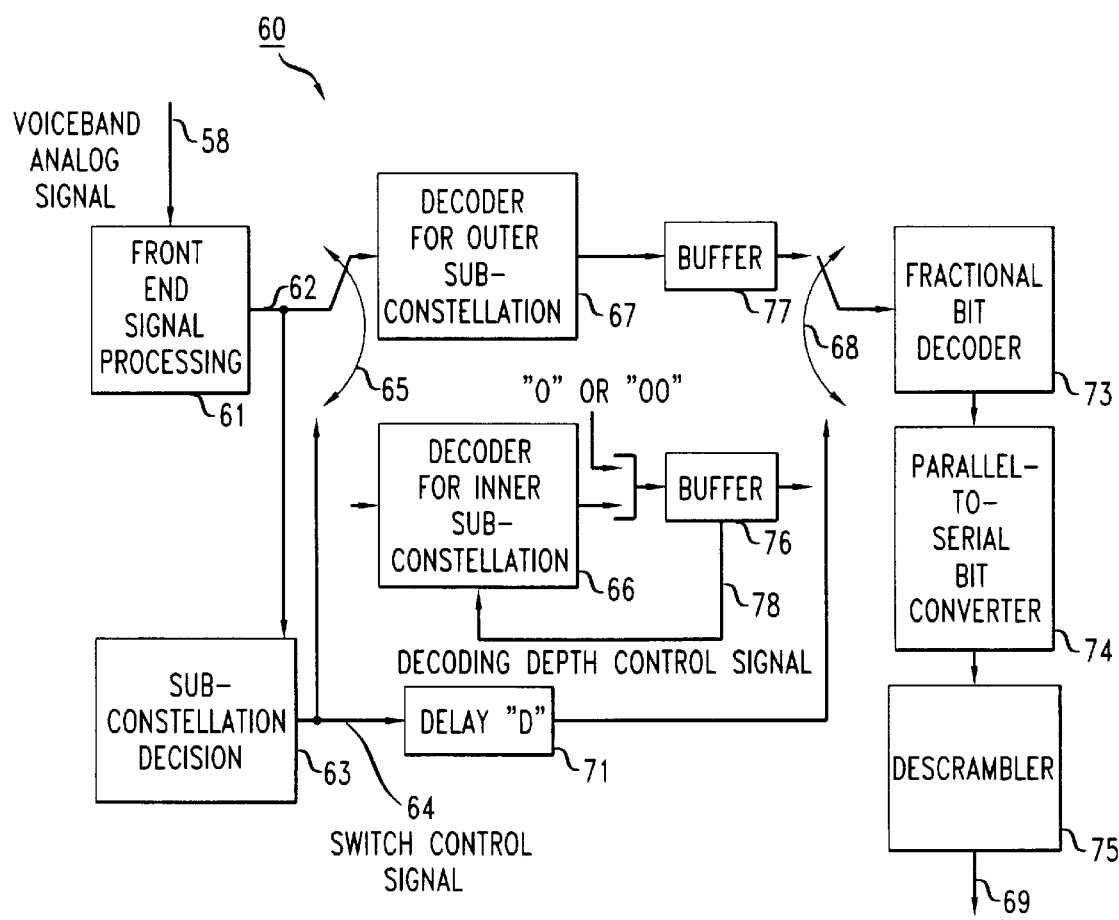
FIG. 8 is a table defining the operation of a fractional bit encoder used in the embodiment of FIG. 7.
FIG. 9 is a block diagram of an illustrative embodiment for the receiving modem used in the telecommunications system of FIG. 1.

Looking at the table of FIG. 8, it can be observed that each bit pair on leads 174 and 175 can assume one of only three possible bit patterns "00" "01", and "10". Thus although there are 7 bits on leads 22, only 96 bit patterns, rather than $2^7$=128 bit patterns, actually appear thereon. Moreover, 32 of those bit patterns—namely the patterns having I6=I7= "0"—are steered via the control signal on lead 32 to coded modulator 372 as in the embodiment of FIG. 3, leaving only 64 bit patterns to be steered to uncoded modulator 382. Indeed, as noted above, the outer sub-constellation comprises 64 signal points. More generally, it can be observed that it may often be advantageous, as here, to utilize the output bits of the fractional bit encoder as the bits which steer the input bits to the coded or uncoded modulator. The reason is that, as can easily be verified, this approach reduces the number of signal points that are needed for the outer sub-constellation which, in turn, allows one to reduce the average transmitted signal power level for a given effective minimum distance of the overall PCM-derived constellation.

Another observation to be made about the bit assignment scheme of FIG. 8 is that the pattern "10" for the bit pair (I7, I6) occurs less often than the other two patterns, assuming random input data. Advantageously, then, as can be verified from Appendix III, those bit patterns with that particular combination of values for (I7, I6) are used to select higher amplitude signal points from the outer sub-constellation. Since that combination occurs less often, this has the effect of reducing the average transmitted signal power over what it would otherwise be.

FIG. 9 is a block diagram of an illustrative embodiment for receiving modem 60 of FIG. 1. In particular, the voiceband analog signal on local loop 58 is applied to front-end signal processing unit 61 which performs such conventional types of processing as automatic gain control, timing recovery, analog-to-digital conversion and equalization. The latter two operations, more particularly, could be as described in U.S. Pat. Nos. 5,394,437 issued Feb. 28, 1995 and 5,578,625 issued Jan. 18, 1996, to Ayanoglu at al., both hereby incorporated by reference. The output of processing unit 61 on lead 62 is a sequence of channel-impaired signal points each of whose amplitudes is represented by some appropriate number of bits greater than 8. Those signal points are applied to sub-constellation decision unit 63 which, for each received signal point, decides based on its amplitude, which sub-constellation that signal point originated from. Since the minimum distance between the sub-constellations in this embodiment is not less than the effective minimum distance of each of the sub-constellations of the PCM-derived constellation, this sub-constellation decision is no less reliable than decisions ultimately to be made about which signal point of any particular sub-constellation may have been transmitted at any particular point in time.

The control signal on control lead 64 at the output of sub-constellation decision unit 63 identifying the sub-constellation controls switch 65 so as to steer the received, channel-impaired signal points to the appropriate one of decoders 66 and 67. In particular, decoder 66 comprises a so-called maximum-likelihood decoder—illustratively a Viterbi decoder—which is adapted to recover, and provide at its output, the five data bits I1 through I5. In addition, the values of steering bits I6 and/or I7, which in the illustrative embodiments are always "0" when the inner sub-constellation is used, are provided "alongside" of the recovered bits I1 through I5 at the output of decoder 66. Each successive 6- or 7-bit word thus generated is placed in a first-in-first-out (FIFO) buffer 76. Decoder 67 comprises a simple slicer which recovers, and provides at its output, a 6- or 7-bit word representing the values of data bits I1 through I6 (I7) that were caused by the uncoded modulator of modem 20 be represented by signal points of the outer sub-constellation. Each successive 6- or 7-bit word thus generated is placed in a FIFO buffer 77.

It will of course be appreciated that in embodiments in which more than two sub-constellations are used, the receiving modem would include a corresponding number of decoders, rather than only two.

The words buffered in buffers 76 and 77 are assembled onto an output stream by being steered by switch 68 in a manner to be described, to fractional bit decoder 73 and thence through parallel-to-serial bit converter 74, descrambler 75 and out onto lead 69. In those embodiments where a fractional bit encoder was not used in the transmitting modem (such as the embodiments of FIG. 3 and 6) fractional bit decoder 73 is not used.

The manner in which switch 68 is controlled arises out of the following considerations: In the Viterbi decoding process, a decision is made as to the value of a particular received signal point only after a particular number of succeeding signal points have been received. That number of signal points is referred to as the decoding depth. For the trellis code used in the disclosed embodiments, a decoding depth of 47 signal points can be used. Thus at a very minimum, a delay of at least 47 signal points must be provided between the appearance of a received signal point on lead 62 and the application of the corresponding recovered data bits to switch 68. Indeed, to provide such a delay, delay element 71 having a delay D is provided between sub-constellation decision unit 63 and switch 68 so that the movement of switch 68 between its "up" and "down" positions will mirror exactly that of switch 65, but delayed by D signaling intervals. Not all of the received signal points originate from the inner sub-constellation, however. In fact, in the embodiments of FIGS. 3, 6 and 7, an average of only one-fourth, one-half, and three-eighths of the signal points, respectively, originate from the inner sub-constellation. Thus the delay D must be set to a sufficiently large value that it is very probable that at the time that switch 68 is in the "down" position, an output from decoder 66 is available in buffer 76. Illustratively, D=191 is used for the embodiment of FIG. 3. This number was arrived at by considering that over 192 signaling internals, 48 signal points, on average will have originated from the inner sub-constellation, which is comparable to the desired decoding depth of the Viterbi decoder. For the other embodiments, where the average frequency of signal points from the inner sub-constellation is greater than in the case of FIG. 3, the value of D can be appropriately reduced with no loss in performance. In any case, the value of D can be increased to any desired value, thereby minimizing to an even greater extent the possibility that buffer 76 will be empty at that time, as long as the throughput delay caused the value of D that is chosen is acceptable for the application at hand.

There is still always a small chance that buffer 76 will be empty when switch 68 is in the down position no matter how large the value of D is. In that case, an output from decoder 66 must be forced to be provided. To this end, when buffer 76 is determined to be empty at a time that a decoded inner sub-constellation signal point is needed, a decoding depth control signal is provided on lead 78, causing the Viterbi decoder within decoder 66 to reduce its current decoding depth so that a decision as to the oldest not-yet-decided received signal point can immediately be made. As will be appreciated by those skilled in the art, this may be accomplished by tracing back within the Viterbi decoder over the trellis path currently having the smallest path metric and picking up the point which corresponds to the oldest not-yet-decided signal point. Given the capability to vary the decoding depth when needed, it is possible, in order to achieve a slight increase in performance, to design the receiver to use a longer decoding depth—say, 63 rather than 47. In the present system, this increase in decoding depth will not change the overall decoding delay.

In order to reduce the probability that buffer 76 will be empty when switch 68 is in the down position, one possibility is to periodically, e.g., once every thirty signal points, force the transmitter to use an inner sub-constellation point by using steering bit value(s) which are forced to be "0" rather than using the steering bit values generated in response to input data. For those signaling intervals in the receiver for which it is known that this forcing occurs, a) switch 65 is forced into the down position and b) the steering bit values that are recovered from the inner constellation decoder for such signaling intervals are discarded by, for example, parallel-to-serial bit converter 74. This, of course, very slightly reduces the data rate for user data but what is gained is a slight increase in error rate performance.

To completely eliminate the possibility that buffer 76 will ever be empty when switch 68 is in the down position, and thereby further increase the error rate performance, one may advantageously "terminate" the trellis code following the teachings of my co-pending provisional U.S. patent application 60/026746 filed Sep. 26, 1996, hereby incorporated by reference. In particular, for the last M signaling intervals of every group of (D+1) signaling intervals, where the trellis code is a $2^M$ state code of the non-systematic form of FIG. 5, one would a) force the steering bit value(s) to be "0" in order to guarantee that the signal points for those signaling intervals are from the inner sub-constellation, and b) at the same time force bit I1 to take on fixed values, such as all "0", so that in the receiver, the final state of the code is known at the point in time that the $(D+1)^{st}$ is received. One can thus always make a reliable decision as to the values of all of the inner sub-constellation signal points that were included within that group of (D+1) signaling intervals, at least as long as there are a minimum of 2M inner sub-constellation signal points within the group of (D+1). By following this approach, it is guaranteed that the maximum decoding delay is D signaling intervals which, in turn, guarantees that, as stated above, buffer 76 is never empty when switch 68 is in the down position. In the receiver, all of the bits whose values are forced in this way to fixed values are appropriately ignored and again this slightly reduces the data rate for user data in exchange for an increase in error rate performance. In the present illustrative embodiments, in particular, M=6, so that over the course of (D+1) signaling intervals, the number of bits that are lost due to the use of this termination procedure in the embodiments of FIGS. 3, 6 and 7 are 3M=18, 2M=12 and 2.5M=15, respectively, which represents approximately a one percent loss in data rate for D=191.

As is well known, a bandlimiting filter (not shown) typically present in PCM vocoder 55 within far end central office 50 will introduce a certain amount of intersymbol interference (ISI) in the signal on local loop 58. This can be dealt with by introducing so-called stuffing bits into the 64 kbps PCM digital signal on lead 25, thereby cutting down on the usable "payload" that can be carried by that signal. This, in turn, cuts down on the data rate that can be supported for the data supplied by server 10. For example, if the stuffing bit rate is 8 kbps, then the usable payload is 56 kbps. Since each signal point of the PCM-derived constellations used herein is represented by 8 bits, the input to parallel-to-serial bit converter 31 is limited to a rate of 7K signal points per second. Since each signal point represents 7 user data bits in, for example, the embodiment of FIG. 3, the data rate supportable on line 15 would be 49 kbps rather than 56. Of course, if some other approach is taken to compensate for this ISI, the full 64 kbps can be used for the payload. Similar considerations apply for the embodiments of FIGS. 6 and 7.

The above discussion has been directed to "downstream" communications from the computer server to the end user terminal. Achieving communications in the reverse, "upstream" direction using a PCM-derived constellation at the high data rates achieved in the downstream direction is a more difficult problem because local loop 58 is an analog line whose loss and other characteristics are not known. Thus in order to use a PCM-derived constellation at these high rates, some mechanism would be required to align the analog levels of the signal received by central office 50 over local loop 58 with the quantization levels of the PCM-derived constellation so that, upon quantization, they are quantized into the levels that are close to the desired levels comprising the PCM-derived constellation.

It does not appear, however, that a reliable such mechanism is currently available. Thus for upstream communications it appears that, currently, only lower data rates can be supported. This may, in any event, not be a problem as, for example, in World Wide Web access applications, as noted earlier. Lower data rates might be supported, for example, by using a PCM-derived constellation either with or without using the sub-constellation approach of the present invention. The reason is that a lower data rate means that the constellation can have fewer signal points which, in turn, means that the constellation and/or sub-constellations can have a greater minimum distance. Thus even though the inability to effectuate the above-mentioned alignment will give rise to a not-insignificant level of quantization noise, the large separation of the signal points of the PCM-derived constellation will allow for accurate data transmission and recovery nonetheless. Another possibility would be to use a conventional analog modem signaling scheme, such as V.34, in the upstream direction. Pursuant to such a scheme, central office would deliver to modem 20 the 8-bit PCM words that it received from network 40, as it would do in any event since computer 10 is subscribed to digital service. Modem 20 would thereupon simply convert the 8-bit PCM words received from central office 30 into, say, 13-bit words using a mu- or A-law conversion and would then proceed to recover the transmitted data using the conventional V.34 protocol.

The foregoing merely illustrates the principles of the invention. Thus for example, it will be appreciated by those skilled in the art that the block diagrams herein represent conceptual views of illustrative circuitry embodying the principles of the invention. The functions of the various elements shown in the FIGS. would, in preferred embodiments, be implemented by one or more programmed processors, digital signal processing (DSP) chips, or the like rather than individual hardware elements. Thus in the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function.

In that same vein, the switches shown in the FIGS. are conceptual only; their function would typically be carried out through the operation of program logic. In particular, one way of achieving the operation described above vis-a-vis the operation of switch 68 would be to a) eliminate delay element 71 and b) constitute buffer 77 as a first-in/first-out buffer capable of storing the data for D signaling intervals. Whenever the signal on lead 64 indicates the reception of a signal point from the outer sub-constellation, the output of decoder 67 is applied to buffer 77. Whenever the signal on lead 64 indicates the reception of a signal point from the inner sub-constellation, invalid data is inserted into buffer 77, i.e., data having a value which is never generated by decoder 67. As data is read out of buffer 77, it is applied to fractional bit decoder 73 (or parallel-to-serial bit converter 74 if decoder 73 is not used) if the data has a valid value. Whenever an invalid value is encountered at the output of buffer 77, data is taken from buffer 76 instead and substituted for the invalid data in the stream applied to decoder 73 (or converter 74).

It is possible that a transmitted signal point will be sufficiently displaced from its original value due to noise and/or other impairments in the channel that sub-constellation decision unit 63 will make an error as to whether the transmitted point originated from the inner or outer sub-constellation. One might think that such an event would have catastrophic consequences vis-a-vis the operation of Viterbi decoder 66. In actuality, however, if a transmitted inner sub-constellation signal point is erroneously processed as an outer sub-constellation signal point in the receiving modem, the result of the maximum likelihood decoding process in the Viterbi decoder is most likely to be that the only thing that will be decoded incorrectly is a few signal points. And while the output of buffer 76 will have data from one fewer signal points than it should, data that substitutes for same will be supplied by buffer 77. Thus although the data that is supplied to switch 68 will be incorrect, there will be no loss of synchronization vis-a-vis the output bit stream as a whole. Similar considerations apply if if a transmitted outer sub-constellation signal point is erroneously processed as an inner sub-constellation signal point in the receiving modem.

If one wanted, it might be possible to subject the steering bits to their own separate error correcting code and use the output of such a code to control the steering function. This would imply in the receiver, that only certain inner/outer sub-constellation signal point sequences could occur, so that one could thereby, through an error correcting decoding process, reduce the error rate for the inner/outer sub-constellation decision. Such an approach would, however, so significantly impact on the data throughput as to be in all likelihood very undesirable. A preferred way to decrease the error rate for the inner/outer sub-constellation decision, if desired, would simply be to arrange the PCM-derived constellation in such a way as to further separate the inner and outer sub-constellations.

Although certain signal paths in FIG. 1, such as 25, 35 and 45, are depicted as carrying only a single 64 kbps stream, this, too, is a conceptual view. Those skilled in the art will appreciate that such paths will often be high-capacity signal paths supporting a number of different multiplexed 64 kbps streams, one of which would be the particular signal stream described herein as originating from transmitting modem 20.

If desired, in order to enhance the overall system's immunity to so-called correlated noise, including so-called bursty noise, a signal point interleaver of known design can be inserted before parallel-to-serial bit converter 31 and a corresponding signal point de-interleaver can be inserted at the output of front-end signal processing unit 61. Such an interleaver/de-interleaver may be of the general type shown, for example, in my U.S. Pat. No. 5,056,112 issued Oct. 8, 1991.

The design of the PCM-derived constellation may take into account various factors other that are present in the existing telephone network. For example, certain older transmission equipments utilize so-called "bit robbing" which, in practical effect, will cause a received signal point to be displaced from its original location in the PCM-derived constellation. Although this effect has not been taken into account in the constellation designs shown herein, one could take it into account by designing the constellation in such a way that hopefully the displacement is within the error correction capability of the overall coded modulation scheme.

The trellis coded modulation used in the illustrative embodiments is one-dimensional trellis coded modulation using a particular 64-state code. However, the invention can be implemented using different trellis codes and/or more-than-one-dimensional (multi-dimensional) coded modulation. As is well known, multi-dimensional modulation may be implemented by representing each so-called channel symbol as a succession of individually transmitted one- or two-dimensional (e.g., QAM) signal points. The latter can be represented as complex quantities having an amplitude and phase.

More particularly for the multi-dimensional case, the so-called "words" that are presented to the modulators in the transmitter will typically be formed by assembling bits received over a number of signaling intervals. For example, if implementing the invention in the context of a four-dimensional coding scheme, one would assemble bits received over four signaling intervals in order to form a word to be presented to one of the modulators. The preferred manner in which this would be done is to examine each output of the transmitter serial-to-parallel bit converter (or parallel-to-serial word converter) for each signaling interval. Whenever the steering bit value(s) which choose the inner sub-constellation appear, that output is combined with other similar outputs until, in this example, four such outputs have been collected, at which point the resulting word would be presented to the coded modulator for selection of a four-dimensional so-called "symbol comprising four one-dimensional signal points." Whenever the steering bit value (s) which choose the outer sub-constellation appear, the outer sub-constellation signal points are selected as before. In order to be able to properly reconstruct the order of the original data at the receiver, the constituent signal points of the four-dimensional symbols will be appropriately interspersed with the selected signal points from the outer sub-constellation.

It is anticipated of the transmitting and receiving modems may well be in different countries—one of which may use mu-law encoding in its telecommunications network and the other of which may use A-law encoding. Optimal implementation of the invention would involve use of a PCM-derived constellation which is based on the type of encoding that is used at the receiving end of the channel. Thus if such international communications are envisioned, the transmitting modem would preferably be capable of encoding the transmitted data using a PCM-derived constellation based on either mu-law or A-law encoding. If, for example, end user terminal 70 initiates the connection, the originating country could be identified at modem 20 from the country code included in the originating telephone number delivered as the so-called ANI. Those in the art will be able to identify other ways by which to identify the country in which the receiving modem is located—and thus determine whether a mu-law- or A-law-derived PCM-derived constellation should be used.

It will thus be appreciated that those skilled in the art will be able to devise numerous arrangements, which although not explicitly shown or described herein, embody the principles of the invention and are within its spirit and scope.

APPENDIX I

| I7 | I6 | I5 | I4 | I3 | I2 | I1 or X1 | X0 | Amplitude of Signal Point | |
|---|---|---|---|---|---|---|---|---|---|
| 1 | 0 | 0 | 1 | 0 | 0 | 1 | — | 1,679.5 | Positive Portion |
| 1 | 0 | 0 | 1 | 0 | 1 | 1 | — | 1,615.5 | of Uncoded |
| 1 | 0 | 0 | 1 | 1 | 1 | 1 | — | 1,551.5 | 96-PAM Outer |
| 1 | 0 | 0 | 1 | 1 | 0 | 1 | — | 1,487.5 | Subconstellation |
| 1 | 0 | 0 | 0 | 1 | 0 | 1 | — | 1,423.5 | |
| 1 | 0 | 0 | 0 | 1 | 1 | 1 | — | 1,359.5 | |
| 1 | 0 | 0 | 0 | 0 | 1 | 1 | — | 1,295.5 | |
| 1 | 0 | 0 | 0 | 0 | 0 | 1 | — | 1,231.5 | |
| 1 | 0 | 1 | 0 | 0 | 0 | 1 | — | 1,167.5 | |
| 1 | 0 | 1 | 0 | 0 | 1 | 1 | — | 1,103.5 | |
| 1 | 0 | 1 | 0 | 1 | 1 | 1 | — | 1,039.5 | |

APPENDIX I-continued

| I7 | I6 | I5 | I4 | I3 | I2 | I1 or X1 | X0 | Amplitude of Signal Point | |
|---|---|---|---|---|---|---|---|---|---|
| 1 | 0 | 1 | 0 | 1 | 0 | 1 | — | 991.5 | |
| 1 | 0 | 1 | 1 | 1 | 0 | 1 | — | 959.5 | |
| 1 | 0 | 1 | 1 | 1 | 1 | 1 | — | 927.5 | |
| 1 | 0 | 1 | 1 | 0 | 1 | 1 | — | 895.5 | |
| 1 | 0 | 1 | 1 | 0 | 0 | 1 | — | 863.5 | |
| 1 | 1 | 1 | 1 | 0 | 0 | 1 | — | 831.5 | |
| 1 | 1 | 1 | 1 | 0 | 1 | 1 | — | 799.5 | |
| 1 | 1 | 1 | 1 | 1 | 1 | 1 | — | 767.5 | |
| 1 | 1 | 1 | 1 | 1 | 0 | 1 | — | 735.5 | |
| 1 | 1 | 1 | 0 | 1 | 0 | 1 | — | 703.5 | |
| 1 | 1 | 1 | 0 | 0 | 1 | 1 | — | 639.5 | |
| 1 | 1 | 1 | 0 | 0 | 0 | 1 | — | 607.5 | |
| 1 | 1 | 0 | 0 | 0 | 0 | 1 | — | 575.5 | |
| 1 | 1 | 0 | 0 | 0 | 1 | 1 | — | 543.5 | |
| 1 | 1 | 0 | 0 | 1 | 1 | 1 | — | 511.5 | |
| 1 | 1 | 0 | 0 | 1 | 0 | 1 | — | 487.5 | |
| 1 | 1 | 0 | 1 | 1 | 0 | 1 | — | 471.5 | |
| 1 | 1 | 0 | 1 | 1 | 1 | 1 | — | 455.5 | |
| 1 | 1 | 0 | 1 | 0 | 1 | 1 | — | 439.5 | |
| 1 | 1 | 0 | 1 | 0 | 0 | 1 | — | 423.5 | |
| 0 | 1 | 0 | 1 | 0 | 0 | 1 | — | 407.5 | |
| 0 | 1 | 0 | 1 | 0 | 1 | 1 | — | 391.5 | |
| 0 | 1 | 0 | 1 | 1 | 1 | 1 | — | 375.5 | |
| 0 | 1 | 0 | 1 | 1 | 0 | 1 | — | 359.5 | |
| 0 | 1 | 0 | 0 | 1 | 0 | 1 | — | 343.5 | |
| 0 | 1 | 0 | 0 | 1 | 1 | 1 | — | 327.5 | |
| 0 | 1 | 0 | 0 | 0 | 1 | 1 | — | 311.5 | |
| 0 | 1 | 0 | 0 | 0 | 0 | 1 | — | 295.5 | |
| 0 | 1 | 1 | 0 | 0 | 0 | 1 | — | 279.5 | |
| 0 | 1 | 1 | 0 | 0 | 1 | 1 | — | 263.5 | |
| 0 | 1 | 1 | 0 | 1 | 1 | 1 | — | 247.5 | |
| 0 | 1 | 1 | 0 | 1 | 0 | 1 | — | 227.5 | |
| 0 | 1 | 1 | 1 | 1 | 0 | 1 | — | 211.5 | |
| 0 | 1 | 1 | 1 | 1 | 1 | 1 | — | 195.5 | |
| 0 | 1 | 1 | 1 | 0 | 1 | 1 | — | 179.5 | |
| 0 | 1 | 1 | 1 | 0 | 0 | 1 | — | 163.5 | |
| 0 | 0 | 1 | 1 | 0 | 0 | 1 | 1 | 147.5 | Coded 64-PAM Inner Subconstellation |
| 0 | 0 | 0 | 1 | 0 | 0 | 1 | 0 | 139.5 | |
| 0 | 0 | 1 | 1 | 0 | 0 | 0 | 1 | 131.5 | |
| 0 | 0 | 0 | 1 | 0 | 0 | 0 | 0 | 123.5 | |
| 0 | 0 | 1 | 1 | 0 | 1 | 1 | 1 | 115.5 | |
| 0 | 0 | 0 | 1 | 0 | 1 | 1 | 0 | 109.5 | |
| 0 | 0 | 1 | 1 | 0 | 1 | 0 | 1 | 105.5 | |
| 0 | 0 | 0 | 1 | 0 | 1 | 0 | 0 | 101.5 | |
| 0 | 0 | 0 | 1 | 1 | 1 | 1 | 1 | 97.5 | |
| 0 | 0 | 1 | 1 | 1 | 1 | 1 | 0 | 93.5 | |
| 0 | 0 | 0 | 1 | 1 | 1 | 0 | 1 | 89.5 | |
| 0 | 0 | 1 | 1 | 1 | 1 | 0 | 0 | 85.5 | |
| 0 | 0 | 1 | 1 | 1 | 0 | 1 | 1 | 81.5 | |
| 0 | 0 | 0 | 1 | 1 | 0 | 1 | 0 | 77.5 | |
| 0 | 0 | 1 | 1 | 1 | 0 | 0 | 1 | 73.5 | |
| 0 | 0 | 0 | 1 | 1 | 0 | 0 | 0 | 69.5 | |
| 0 | 0 | 1 | 0 | 1 | 0 | 1 | 1 | 65.5 | |
| 0 | 0 | 0 | 0 | 1 | 0 | 1 | 0 | 61.5 | |
| 0 | 0 | 1 | 0 | 1 | 0 | 0 | 1 | 57.5 | |
| 0 | 0 | 0 | 0 | 1 | 0 | 0 | 0 | 53.5 | |
| 0 | 0 | 1 | 0 | 1 | 1 | 1 | 1 | 46.5 | |
| 0 | 0 | 0 | 0 | 1 | 1 | 1 | 0 | 42.5 | |
| 0 | 0 | 1 | 0 | 1 | 1 | 0 | 1 | 38.5 | |
| 0 | 0 | 0 | 0 | 1 | 1 | 0 | 0 | 34.5 | |
| 0 | 0 | 1 | 0 | 0 | 1 | 1 | 1 | 30.5 | |
| 0 | 0 | 0 | 0 | 0 | 1 | 1 | 0 | 26.5 | |
| 0 | 0 | 1 | 0 | 0 | 1 | 0 | 1 | 22.5 | |
| 0 | 0 | 0 | 0 | 0 | 1 | 0 | 0 | 18.5 | |
| 0 | 0 | 1 | 0 | 0 | 0 | 1 | 1 | 14.0 | |
| 0 | 0 | 0 | 0 | 0 | 0 | 1 | 0 | 10.0 | |
| 0 | 0 | 1 | 0 | 0 | 0 | 0 | 1 | 6.0 | |
| 0 | 0 | 0 | 0 | 0 | 0 | 0 | 0 | 2.0 | |
| 0 | 0 | 0 | 0 | 0 | 0 | 1 | 1 | -2.0 | |
| 0 | 0 | 1 | 0 | 0 | 0 | 1 | 0 | -6.0 | |
| 0 | 0 | 0 | 0 | 0 | 0 | 0 | 1 | -10.0 | |
| 0 | 0 | 1 | 0 | 0 | 0 | 0 | 0 | -14.0 | |
| 0 | 0 | 0 | 0 | 0 | 1 | 1 | 1 | -18.5 | |
| 0 | 0 | 1 | 0 | 0 | 1 | 1 | 0 | -22.5 | |
| 0 | 0 | 0 | 0 | 0 | 1 | 0 | 1 | -26.5 | |
| 0 | 0 | 1 | 0 | 0 | 1 | 0 | 0 | -30.5 | |
| 0 | 0 | 0 | 0 | 1 | 1 | 1 | 1 | -34.5 | |
| 0 | 0 | 1 | 0 | 1 | 1 | 1 | 0 | -38.5 | |
| 0 | 0 | 1 | 0 | 1 | 1 | 0 | 1 | -42.5 | |
| 0 | 0 | 1 | 0 | 1 | 1 | 0 | 0 | -46.5 | |
| 0 | 0 | 0 | 0 | 1 | 0 | 1 | 1 | -53.5 | |
| 0 | 0 | 1 | 0 | 1 | 0 | 1 | 0 | -57.5 | |
| 0 | 0 | 0 | 0 | 1 | 0 | 0 | 1 | -61.5 | |
| 0 | 0 | 1 | 0 | 1 | 0 | 0 | 0 | -65.5 | |
| 0 | 0 | 0 | 1 | 1 | 0 | 1 | 1 | -69.5 | |
| 0 | 0 | 1 | 1 | 1 | 0 | 1 | 0 | -73.5 | |
| 0 | 0 | 0 | 1 | 1 | 0 | 0 | 1 | -77.5 | |
| 0 | 0 | 1 | 1 | 1 | 0 | 0 | 0 | -81.5 | |
| 0 | 0 | 0 | 1 | 1 | 1 | 1 | 1 | -85.5 | |
| 0 | 0 | 1 | 1 | 1 | 1 | 1 | 0 | -89.5 | |
| 0 | 0 | 0 | 1 | 1 | 1 | 0 | 1 | -93.5 | |
| 0 | 0 | 1 | 1 | 1 | 1 | 0 | 0 | -97.5 | |
| 0 | 0 | 0 | 1 | 0 | 1 | 1 | 1 | -101.5 | |
| 0 | 0 | 1 | 1 | 0 | 1 | 1 | 0 | -105.5 | |
| 0 | 0 | 0 | 1 | 0 | 1 | 0 | 1 | -109.5 | |
| 0 | 0 | 1 | 1 | 0 | 1 | 0 | 0 | -115.5 | |
| 0 | 0 | 0 | 1 | 0 | 0 | 1 | 1 | -123.5 | |
| 0 | 0 | 1 | 1 | 0 | 0 | 1 | 0 | -131.5 | |
| 0 | 0 | 0 | 1 | 0 | 0 | 0 | 1 | -139.5 | |
| 0 | 0 | 1 | 1 | 0 | 0 | 0 | 0 | -147.5 | |
| 0 | 1 | 1 | 1 | 0 | 0 | 0 | — | -163.5 | Negative Portion of Uncoded 96-PAM Outer Subconstellation |
| 0 | 1 | 1 | 1 | 0 | 1 | 0 | — | -179.5 | |
| 0 | 1 | 1 | 1 | 1 | 1 | 0 | — | -195.5 | |
| 0 | 1 | 1 | 1 | 1 | 0 | 0 | — | -211.5 | |
| 0 | 1 | 1 | 0 | 1 | 0 | 0 | — | -227.5 | |
| 0 | 1 | 1 | 0 | 1 | 1 | 0 | — | -247.5 | |
| 0 | 1 | 1 | 0 | 0 | 1 | 0 | — | -263.5 | |
| 0 | 1 | 1 | 0 | 0 | 0 | 0 | — | -279.5 | |
| 0 | 1 | 0 | 0 | 0 | 0 | 0 | — | -295.5 | |
| 0 | 1 | 0 | 0 | 0 | 1 | 0 | — | -311.5 | |
| 0 | 1 | 0 | 0 | 1 | 1 | 0 | — | -327.5 | |
| 0 | 1 | 0 | 0 | 1 | 0 | 0 | — | -343.5 | |
| 0 | 1 | 0 | 1 | 1 | 0 | 0 | — | -359.5 | |
| 0 | 1 | 0 | 1 | 1 | 1 | 0 | — | -375.5 | |
| 0 | 1 | 0 | 1 | 0 | 1 | 0 | — | -391.5 | |
| 0 | 1 | 0 | 1 | 0 | 0 | 0 | — | -407.5 | |
| 1 | 1 | 0 | 1 | 0 | 0 | 0 | — | -423.5 | |
| 1 | 1 | 0 | 1 | 0 | 1 | 0 | — | -439.5 | |
| 1 | 1 | 0 | 1 | 1 | 1 | 0 | — | -455.5 | |
| 1 | 1 | 0 | 1 | 1 | 0 | 0 | — | -471.5 | |
| 1 | 1 | 0 | 0 | 1 | 0 | 0 | — | -487.5 | |
| 1 | 1 | 0 | 0 | 1 | 1 | 0 | — | -511.5 | |
| 1 | 1 | 0 | 0 | 0 | 1 | 0 | — | -543.5 | |
| 1 | 1 | 0 | 0 | 0 | 0 | 0 | — | -575.5 | |
| 1 | 1 | 1 | 0 | 0 | 0 | 0 | — | -607.5 | |
| 1 | 1 | 1 | 0 | 0 | 1 | 0 | — | -639.5 | |
| 1 | 1 | 1 | 0 | 1 | 1 | 0 | — | -671.5 | |
| 1 | 1 | 1 | 0 | 1 | 0 | 0 | — | -703.5 | |
| 1 | 1 | 1 | 1 | 1 | 0 | 0 | — | -735.5 | |
| 1 | 1 | 1 | 1 | 1 | 1 | 0 | — | -767.5 | |
| 1 | 1 | 1 | 1 | 0 | 1 | 0 | — | -799.5 | |
| 1 | 1 | 1 | 1 | 0 | 0 | 0 | — | -831.5 | |
| 1 | 0 | 1 | 1 | 0 | 0 | 0 | — | -863.5 | |
| 1 | 0 | 1 | 1 | 0 | 1 | 0 | — | -895.5 | |
| 1 | 0 | 1 | 1 | 1 | 1 | 0 | — | -927.5 | |
| 1 | 0 | 1 | 1 | 1 | 0 | 0 | — | -959.5 | |
| 1 | 0 | 1 | 0 | 1 | 0 | 0 | — | -991.5 | |
| 1 | 0 | 1 | 0 | 1 | 1 | 0 | — | -1,039.5 | |
| 1 | 0 | 1 | 0 | 0 | 1 | 0 | — | -1,103.5 | |
| 1 | 0 | 1 | 0 | 0 | 0 | 0 | — | -1,167.5 | |
| 1 | 0 | 0 | 0 | 0 | 0 | 0 | — | -1,231.5 | |
| 1 | 0 | 0 | 0 | 0 | 1 | 0 | — | -1,295.5 | |
| 1 | 0 | 0 | 0 | 1 | 1 | 0 | — | -1,359.5 | |
| 1 | 0 | 0 | 0 | 1 | 0 | 0 | — | -1,423.5 | |
| 1 | 0 | 0 | 1 | 1 | 0 | 0 | — | -1,487.5 | |
| 1 | 0 | 0 | 1 | 1 | 1 | 0 | — | -1,551.5 | |
| 1 | 0 | 0 | 1 | 0 | 1 | 0 | — | -1,615.5 | |
| 1 | 0 | 0 | 1 | 0 | 0 | 0 | — | -1,679.5 | |

APPENDIX II

| I6 | I5 | I4 | I3 | I2 | I1 or X1 | X0 | Amplitude of Signal Point | |
|---|---|---|---|---|---|---|---|---|
| 1 | 0 | 1 | 0 | 0 | 1 | — | 1,615.5 | Positive Portion |
| 1 | 0 | 1 | 0 | 1 | 1 | — | 1,551.5 | of Uncoded |
| 1 | 0 | 1 | 1 | 1 | 1 | — | 1,487.5 | 32-PAM Outer |
| 1 | 0 | 1 | 1 | 0 | 1 | — | 1,423.5 | Subcontellation |
| 1 | 0 | 0 | 1 | 0 | 1 | — | 1,359.5 | |
| 1 | 0 | 0 | 1 | 1 | 1 | — | 1,295.5 | |
| 1 | 0 | 0 | 0 | 1 | 1 | — | 1,231.5 | |
| 1 | 0 | 0 | 0 | 0 | 1 | — | 1,167.5 | |
| 1 | 1 | 0 | 0 | 0 | 1 | — | 1,103.5 | |
| 1 | 1 | 0 | 0 | 1 | 1 | — | 991.5 | |
| 1 | 1 | 0 | 1 | 1 | 1 | — | 927.5 | |
| 1 | 1 | 0 | 1 | 0 | 1 | — | 863.5 | |
| 1 | 1 | 1 | 1 | 0 | 1 | — | 799.5 | |
| 1 | 1 | 1 | 1 | 1 | 1 | — | 735.5 | |
| 1 | 1 | 1 | 0 | 1 | 1 | — | 671.5 | |
| 1 | 1 | 1 | 0 | 0 | 1 | — | 607.5 | |
| 0 | 1 | 1 | 0 | 0 | 1 | 1 | 543.5 | Coded 64-PAM |
| 0 | 0 | 1 | 0 | 0 | 1 | 0 | 511.5 | Inner |
| 0 | 1 | 1 | 0 | 0 | 0 | 1 | 487.5 | Subcontellation |
| 0 | 0 | 1 | 0 | 0 | 0 | 0 | 471.5 | |
| 0 | 1 | 1 | 0 | 1 | 1 | 1 | 455.5 | |
| 0 | 0 | 1 | 0 | 1 | 1 | 0 | 439.5 | |
| 0 | 1 | 1 | 0 | 1 | 0 | 1 | 423.5 | |
| 0 | 0 | 1 | 0 | 1 | 0 | 0 | 407.5 | |
| 0 | 1 | 1 | 1 | 1 | 1 | 1 | 391.5 | |
| 0 | 0 | 1 | 1 | 1 | 1 | 0 | 375.5 | |
| 0 | 1 | 1 | 1 | 1 | 0 | 1 | 359.5 | |
| 0 | 0 | 1 | 1 | 1 | 0 | 0 | 343.5 | |
| 0 | 1 | 1 | 1 | 0 | 1 | 1 | 327.5 | |
| 0 | 0 | 1 | 1 | 0 | 1 | 0 | 311.5 | |
| 0 | 1 | 1 | 1 | 0 | 0 | 1 | 295.5 | |
| 0 | 0 | 1 | 1 | 0 | 0 | 0 | 279.5 | |
| 0 | 1 | 0 | 1 | 0 | 1 | 1 | 263.5 | |
| 0 | 0 | 0 | 1 | 0 | 1 | 0 | 235.5 | |
| 0 | 1 | 0 | 1 | 0 | 0 | 1 | 219.5 | |
| 0 | 0 | 0 | 1 | 0 | 0 | 0 | 203.5 | |
| 0 | 1 | 0 | 1 | 1 | 1 | 1 | 187.5 | |
| 0 | 0 | 0 | 1 | 1 | 1 | 0 | 171.5 | |
| 0 | 1 | 0 | 1 | 1 | 0 | 1 | 155.5 | |
| 0 | 0 | 0 | 1 | 1 | 0 | 0 | 139.5 | |
| 0 | 1 | 0 | 0 | 1 | 1 | 1 | 123.5 | |
| 0 | 0 | 0 | 0 | 1 | 1 | 0 | 105.5 | |
| 0 | 1 | 0 | 0 | 1 | 0 | 1 | 89.5 | |
| 0 | 0 | 0 | 0 | 1 | 0 | 0 | 73.5 | |
| 0 | 1 | 0 | 0 | 0 | 1 | 1 | 57.5 | |
| 0 | 0 | 0 | 0 | 0 | 1 | 0 | 40.5 | |
| 0 | 1 | 0 | 0 | 0 | 0 | 1 | 24.5 | |
| 0 | 0 | 0 | 0 | 0 | 0 | 0 | 8.0 | |
| 0 | 0 | 0 | 0 | 0 | 1 | 1 | −8.0 | |
| 0 | 1 | 0 | 0 | 0 | 1 | 0 | −24.5 | |
| 0 | 0 | 0 | 0 | 0 | 0 | 1 | −40.5 | |
| 0 | 1 | 0 | 0 | 0 | 0 | 0 | −57.5 | |
| 0 | 0 | 0 | 0 | 1 | 1 | 1 | −73.5 | |
| 0 | 1 | 0 | 0 | 1 | 1 | 0 | −89.5 | |
| 0 | 0 | 0 | 0 | 1 | 0 | 1 | −105.5 | |
| 0 | 1 | 0 | 0 | 1 | 0 | 0 | −123.5 | |
| 0 | 0 | 0 | 1 | 1 | 1 | 1 | −139.5 | |
| 0 | 1 | 0 | 1 | 1 | 1 | 0 | −155.5 | |
| 0 | 0 | 0 | 1 | 1 | 0 | 1 | −171.5 | |
| 0 | 1 | 0 | 1 | 1 | 0 | 0 | −187.5 | |
| 0 | 0 | 0 | 1 | 0 | 1 | 1 | −203.5 | |
| 0 | 1 | 0 | 1 | 0 | 1 | 0 | −219.5 | |
| 0 | 0 | 0 | 1 | 0 | 0 | 1 | −235.5 | |
| 0 | 1 | 0 | 1 | 0 | 0 | 0 | −263.5 | |
| 0 | 0 | 1 | 1 | 0 | 1 | 1 | −279.5 | |
| 0 | 1 | 1 | 1 | 0 | 1 | 0 | −295.5 | |
| 0 | 0 | 1 | 1 | 0 | 0 | 1 | −311.5 | |
| 0 | 1 | 1 | 1 | 0 | 0 | 0 | −327.5 | |
| 0 | 0 | 1 | 1 | 1 | 1 | 1 | −343.5 | |
| 0 | 1 | 1 | 1 | 1 | 1 | 0 | −359.5 | |
| 0 | 0 | 1 | 1 | 1 | 0 | 1 | −375.5 | |
| 0 | 1 | 1 | 1 | 1 | 0 | 0 | −391.5 | |
| 0 | 0 | 1 | 0 | 1 | 1 | 1 | −407.5 | |
| 0 | 1 | 1 | 0 | 1 | 1 | 0 | −423.5 | |
| 0 | 0 | 1 | 0 | 1 | 0 | 1 | −439.5 | |
| 0 | 1 | 1 | 0 | 1 | 0 | 0 | −455.5 | |
| 0 | 0 | 1 | 0 | 0 | 1 | 1 | −471.5 | |
| 0 | 1 | 1 | 0 | 0 | 1 | 0 | −487.5 | |
| 0 | 0 | 1 | 0 | 0 | 0 | 1 | −511.5 | |
| 0 | 1 | 1 | 0 | 0 | 0 | 0 | −543.5 | |
| 1 | 1 | 1 | 0 | 0 | 0 | — | −607.5 | Negative Portion |
| 1 | 1 | 1 | 0 | 1 | 0 | — | −671.5 | of Uncoded |
| 1 | 1 | 1 | 1 | 1 | 0 | — | −735.5 | 32-PAM Outer |
| 1 | 1 | 1 | 1 | 0 | 0 | — | −799.5 | Subcontellation |
| 1 | 1 | 0 | 1 | 0 | 0 | — | −863.5 | |
| 1 | 1 | 0 | 1 | 1 | 0 | — | −927.5 | |
| 1 | 1 | 0 | 0 | 1 | 0 | — | −991.5 | |
| 1 | 1 | 0 | 0 | 0 | 0 | — | −1,103.5 | |
| 1 | 0 | 0 | 0 | 0 | 0 | — | −1,167.5 | |
| 1 | 0 | 0 | 0 | 1 | 0 | — | −1,231.5 | |
| 1 | 0 | 0 | 1 | 1 | 0 | — | −1,295.5 | |
| 1 | 0 | 0 | 1 | 0 | 0 | — | −1,359.5 | |
| 1 | 0 | 1 | 1 | 0 | 0 | — | −1,423.5 | |
| 1 | 0 | 1 | 1 | 1 | 0 | — | −1,487.5 | |
| 1 | 0 | 1 | 0 | 1 | 0 | — | −1,551.5 | |
| 1 | 0 | 1 | 0 | 0 | 0 | — | −1,615.5 | |

APPENDIX III

| I7 | I6 | I5 | I4 | I3 | I2 | I1 or X1 | X0 | Amplitude of Signal Point | |
|---|---|---|---|---|---|---|---|---|---|
| 1 | 0 | 1 | 1 | 0 | 1 | 1 | — | 1,615.5 | Positive Portion |
| 1 | 0 | 1 | 1 | 0 | 1 | 1 | — | 1,551.5 | of Uncoded |
| 1 | 0 | 1 | 1 | 1 | 1 | 1 | — | 1,487.5 | 64-PAM Outer |
| 1 | 0 | 1 | 1 | 1 | 0 | 1 | — | 1,423.5 | Subconstellation |
| 1 | 0 | 1 | 0 | 1 | 0 | 1 | — | 1,359.5 | |
| 1 | 0 | 1 | 0 | 1 | 1 | 1 | — | 1,295.5 | |
| 1 | 0 | 1 | 0 | 0 | 1 | 1 | — | 1,231.5 | |
| 1 | 0 | 1 | 0 | 0 | 0 | 1 | — | 1,167.5 | |
| 1 | 0 | 0 | 0 | 0 | 0 | 1 | — | 1,103.5 | |
| 1 | 0 | 0 | 0 | 0 | 1 | 1 | — | 1,039.5 | |
| 1 | 0 | 0 | 0 | 1 | 1 | 1 | — | 991.5 | |
| 1 | 0 | 0 | 0 | 1 | 0 | 1 | — | 959.5 | |
| 1 | 0 | 0 | 1 | 1 | 0 | 1 | — | 927.5 | |
| 1 | 0 | 0 | 1 | 1 | 1 | 1 | — | 895.5 | |
| 1 | 0 | 0 | 1 | 0 | 1 | 1 | — | 863.5 | |
| 1 | 0 | 0 | 1 | 0 | 0 | 1 | — | 831.5 | |
| 0 | 1 | 0 | 1 | 0 | 0 | 1 | — | 799.5 | |
| 0 | 1 | 0 | 1 | 0 | 1 | 1 | — | 767.5 | |
| 0 | 1 | 0 | 1 | 1 | 1 | 1 | — | 735.5 | |
| 0 | 1 | 0 | 1 | 1 | 0 | 1 | — | 703.5 | |
| 0 | 1 | 0 | 0 | 1 | 0 | 1 | — | 671.5 | |
| 0 | 1 | 0 | 0 | 1 | 1 | 1 | — | 639.5 | |
| 0 | 1 | 0 | 0 | 0 | 1 | 1 | — | 607.5 | |
| 0 | 1 | 0 | 0 | 0 | 0 | 1 | — | 575.5 | |
| 0 | 1 | 1 | 0 | 0 | 0 | 1 | — | 543.5 | |
| 0 | 1 | 1 | 0 | 0 | 1 | 1 | — | 511.5 | |
| 0 | 1 | 1 | 0 | 1 | 1 | 1 | — | 471.5 | |
| 0 | 1 | 1 | 0 | 1 | 0 | 1 | — | 439.5 | |
| 0 | 1 | 1 | 1 | 1 | 0 | 1 | — | 407.5 | |
| 0 | 1 | 1 | 1 | 1 | 1 | 1 | — | 375.5 | |
| 0 | 1 | 1 | 1 | 0 | 1 | 1 | — | 343.5 | |
| 0 | 1 | 1 | 1 | 0 | 0 | 1 | — | 311.5 | |
| 0 | 0 | 1 | 1 | 0 | 0 | 1 | 1 | 279.5 | Coded 64-PAM |
| 0 | 0 | 1 | 1 | 0 | 0 | 1 | 0 | 263.5 | Inner |
| 0 | 0 | 1 | 1 | 0 | 0 | 0 | 1 | 247.5 | Subconstellation |
| 0 | 0 | 1 | 1 | 0 | 1 | 1 | 1 | 227.5 | |
| 0 | 0 | 1 | 1 | 0 | 1 | 1 | 0 | 219.5 | |
| 0 | 0 | 1 | 1 | 0 | 1 | 0 | 1 | 211.5 | |
| 0 | 0 | 1 | 1 | 0 | 1 | 0 | 0 | 203.5 | |
| 0 | 0 | 1 | 1 | 1 | 1 | 1 | 1 | 195.5 | |
| 0 | 0 | 1 | 1 | 1 | 1 | 1 | 0 | 187.5 | |
| 0 | 0 | 1 | 1 | 1 | 1 | 0 | 1 | 179.5 | |
| 0 | 0 | 1 | 1 | 1 | 0 | 0 | 0 | 171.5 | |
| 0 | 0 | 1 | 1 | 1 | 0 | 1 | 1 | 163.5 | |

APPENDIX III-continued

| I7 | I6 | I5 | I4 | I3 | I2 | I1 or X1 | X0 | Amplitude of Signal Point | |
|---|---|---|---|---|---|---|---|---|---|
| 0 | 0 | 0 | 1 | 1 | 0 | 1 | 0 | 155.5 | |
| 0 | 0 | 1 | 1 | 1 | 0 | 0 | 1 | 147.5 | |
| 0 | 0 | 0 | 1 | 1 | 0 | 0 | 0 | 139.5 | |
| 0 | 0 | 1 | 0 | 1 | 0 | 1 | 1 | 131.5 | |
| 0 | 0 | 0 | 0 | 1 | 0 | 1 | 0 | 123.5 | |
| 0 | 0 | 1 | 0 | 1 | 0 | 0 | 1 | 109.5 | |
| 0 | 0 | 0 | 0 | 1 | 0 | 0 | 0 | 101.5 | |
| 0 | 0 | 1 | 0 | 1 | 1 | 1 | 1 | 93.5 | |
| 0 | 0 | 0 | 0 | 1 | 1 | 1 | 0 | 85.5 | |
| 0 | 0 | 1 | 0 | 1 | 1 | 0 | 1 | 77.5 | |
| 0 | 0 | 0 | 0 | 1 | 1 | 0 | 0 | 69.5 | |
| 0 | 0 | 1 | 0 | 0 | 1 | 1 | 1 | 61.5 | |
| 0 | 0 | 0 | 0 | 0 | 1 | 1 | 0 | 53.5 | |
| 0 | 0 | 1 | 0 | 0 | 1 | 0 | 1 | 44.5 | |
| 0 | 0 | 0 | 0 | 0 | 1 | 0 | 0 | 36.5 | |
| 0 | 0 | 1 | 0 | 0 | 0 | 1 | 1 | 28.5 | |
| 0 | 0 | 0 | 0 | 0 | 0 | 1 | 0 | 20.5 | |
| 0 | 0 | 1 | 0 | 0 | 0 | 0 | 1 | 12.0 | |
| 0 | 0 | 0 | 0 | 0 | 0 | 0 | 0 | 4.0 | |
| 0 | 0 | 0 | 0 | 0 | 0 | 1 | 1 | −4.0 | |
| 0 | 0 | 1 | 0 | 0 | 0 | 1 | 0 | −12.0 | |
| 0 | 0 | 0 | 0 | 0 | 0 | 0 | 1 | −20.5 | |
| 0 | 0 | 1 | 0 | 0 | 0 | 0 | 0 | −28.5 | |
| 0 | 0 | 0 | 0 | 0 | 1 | 1 | 1 | −36.5 | |
| 0 | 0 | 1 | 0 | 0 | 1 | 1 | 0 | −44.5 | |
| 0 | 0 | 0 | 0 | 0 | 1 | 0 | 1 | −53.5 | |
| 0 | 0 | 1 | 0 | 0 | 1 | 0 | 0 | −61.5 | |
| 0 | 0 | 0 | 0 | 1 | 1 | 1 | 1 | −69.5 | |
| 0 | 0 | 1 | 0 | 1 | 1 | 1 | 0 | −77.5 | |
| 0 | 0 | 0 | 0 | 1 | 1 | 0 | 1 | −85.5 | |
| 0 | 0 | 1 | 0 | 1 | 1 | 0 | 0 | −93.5 | |
| 0 | 0 | 0 | 0 | 1 | 0 | 1 | 1 | −101.5 | |
| 0 | 0 | 1 | 0 | 1 | 0 | 1 | 0 | −109.5 | |
| 0 | 0 | 0 | 0 | 1 | 0 | 0 | 1 | −123.5 | |
| 0 | 0 | 1 | 0 | 1 | 0 | 0 | 0 | −131.5 | |
| 0 | 0 | 0 | 1 | 1 | 0 | 1 | 1 | −139.5 | |
| 0 | 0 | 1 | 1 | 1 | 0 | 1 | 0 | −147.5 | |
| 0 | 0 | 0 | 1 | 1 | 0 | 0 | 1 | −155.5 | |
| 0 | 0 | 1 | 1 | 1 | 0 | 0 | 0 | −163.5 | |
| 0 | 0 | 0 | 1 | 1 | 1 | 1 | 1 | −171.5 | |
| 0 | 0 | 1 | 1 | 1 | 1 | 1 | 0 | −179.5 | |
| 0 | 0 | 0 | 1 | 1 | 1 | 0 | 1 | −187.5 | |
| 0 | 0 | 1 | 1 | 1 | 1 | 0 | 0 | −195.5 | |
| 0 | 0 | 0 | 1 | 0 | 1 | 1 | 1 | −203.5 | |
| 0 | 0 | 1 | 1 | 0 | 1 | 1 | 0 | −211.5 | |
| 0 | 0 | 0 | 1 | 0 | 1 | 0 | 1 | −219.5 | |
| 0 | 0 | 1 | 1 | 0 | 1 | 0 | 0 | −227.5 | |
| 0 | 0 | 0 | 1 | 0 | 0 | 1 | 1 | −235.5 | |
| 0 | 0 | 1 | 1 | 0 | 0 | 1 | 0 | −247.5 | |
| 0 | 0 | 0 | 1 | 0 | 0 | 0 | 1 | −263.5 | |
| 0 | 0 | 1 | 1 | 0 | 0 | 0 | 0 | −279.5 | |
| 0 | 1 | 1 | 1 | 0 | 0 | 0 | — | −311.5 | Negative Portion of Uncoded 64-PAM Outer Subconstellation |
| 0 | 1 | 1 | 1 | 0 | 1 | 0 | — | −343.5 | |
| 0 | 1 | 1 | 1 | 1 | 1 | 0 | — | −375.5 | |
| 0 | 1 | 1 | 1 | 1 | 0 | 0 | — | −407.5 | |
| 0 | 1 | 1 | 0 | 1 | 0 | 0 | — | −439.5 | |
| 0 | 1 | 1 | 0 | 1 | 1 | 0 | — | −471.5 | |
| 0 | 1 | 1 | 0 | 0 | 1 | 0 | — | −511.5 | |
| 0 | 1 | 1 | 0 | 0 | 0 | 0 | — | −543.5 | |
| 0 | 1 | 0 | 0 | 0 | 0 | 0 | — | −575.5 | |
| 0 | 1 | 0 | 0 | 0 | 1 | 0 | — | −607.5 | |
| 0 | 1 | 0 | 0 | 1 | 1 | 0 | — | −639.5 | |
| o. | 1 | 0 | 0 | 1 | 0 | 0 | — | −671.5 | |
| 0 | 1 | 0 | 1 | 1 | 0 | 0 | — | −703.5 | |
| 0 | 1 | 0 | 1 | 1 | 1 | 0 | — | −735.5 | |
| 0 | 1 | 0 | 1 | 0 | 1 | 0 | — | −767.5 | |
| 0 | 1 | 0 | 1 | 0 | 0 | 0 | — | −799.5 | |
| 1 | 0 | 0 | 1 | 0 | 0 | 0 | — | −831.5 | |
| 1 | 0 | 0 | 1 | 0 | 1 | 0 | — | −863.5 | |
| 1 | 0 | 0 | 1 | 1 | 1 | 0 | — | −895.5 | |
| 1 | 0 | 0 | 1 | 1 | 0 | 0 | — | −927.5 | |
| 1 | 0 | 0 | 0 | 1 | 0 | 0 | — | −959.5 | |
| 1 | 0 | 0 | 0 | 1 | 1 | 0 | — | −991.5 | |
| 1 | 0 | 0 | 0 | 0 | 1 | 0 | — | −1,039.5 | |
| 1 | 0 | 0 | 0 | 0 | 0 | 0 | — | −1,103.5 | |
| 1 | 0 | 1 | 0 | 0 | 0 | 0 | — | −1,167.5 | |
| 1 | 0 | 1 | 0 | 0 | 1 | 0 | — | −1,231.5 | |
| 1 | 0 | 1 | 0 | 1 | 1 | 0 | — | −1,295.5 | |
| 1 | 0 | 1 | 0 | 1 | 0 | 0 | — | −1,359.5 | |
| 1 | 0 | 1 | 1 | 1 | 0 | 0 | — | −1,423.5 | |
| 1 | 0 | 1 | 1 | 1 | 1 | 0 | — | −1,487.5 | |
| 1 | 0 | 1 | 1 | 0 | 1 | 0 | — | −1,551.5 | |
| 1 | 0 | 1 | 1 | 0 | 0 | 0 | — | −1,615.5 | |

I claim:

1. A method comprising the steps of selecting, in response to input data, a stream of signal points of a predetermined constellation, the constellation comprising at least first and second sub-constellations, the selecting step including the step of coding the input data in such a way that a) the signal points selected from the first sub-constellation are selected independently of the selection of signal points from the second sub-constellation, and b) decibel gain is provided in the minimum distance between the signal points selected from the first sub-constellation which is greater than any decibel gain provided in the minimum distance between the signal points selected from the second sub-constellation, and generating an output signal representing the selected stream of signal points.

2. The invention of claim 1 wherein said first and second sub-constellations are non-overlapping.

3. The invention of claim 2 wherein said first sub-constellation decibel gain is provided by the steps of utilizing a predetermined redundancy code to generate a redundancy encoded signal which is a function of portions of the input data, and using the redundancy encoded signal to select signal points exclusively from the first sub-constellation.

4. The invention of claim 1 wherein said input data is arranged in data words and wherein said first sub-constellation decibel gain is provided by the steps of trellis encoding a portion of each of a first plurality of data words to identify a particular one of a plurality of subsets of the first sub-constellation, and using the remainder of said each of said first plurality of data words to select a particular signal point from the identified subset.

5. The invention of claim 4 wherein the actual minimum distance between the signal points of each of said subsets is greater than the actual minimum distance between the signal points of the first sub-constellation.

6. The invention of claim 1 wherein a particular sub-constellation that a particular signal point in the stream of signal points selected from is determined in response to at least a portion of the input data.

7. The invention of claim 6 wherein the input data comprises a sequence of multibit words, wherein the value of at least one of the bits of each multibit word identifies said particular sub-constellation and wherein at least the other bits of said each multibit word are used to select said particular signal point.

8. The invention of claim 1 wherein the actual minimum distance between the signal points of the first subconstellation is smaller than the actual minimum distance between the signal points of the second sub-constellation.

9. The invention of claim 1 wherein the signal points of the first sub-constellation are all of lower amplitude than any of the signal points of the second sub-constellation.

10. The invention of claim 9 wherein the predetermined constellation comprises only said first and second sub-constellations and wherein the input data is coded in such a way that decibel gain is provided only in the minimum distance between the signal points selected from the first sub-constellation.

11. The invention of claims 1, 6, or 8 wherein the signal points of the predetermined constellation are particular mu-law or A-law coder quantization levels.

12. A method comprising the steps of
receiving a stream of N-bit words,
for each received N-bit word whose bits at $q \geq 1$ predetermined bit positions have particular predetermined values,
trellis encoding the bits at $k \geq 1$ predetermined bit positions of that word to generate p>k trellis encoded bits, and selecting, in response to said trellis encoded bits and at least one of the other, N–k bits, signal points from a first sub-constellation of a predetermined PCM-derived constellation,
and for each of the others of said received N-bit words,
selecting, in response to at least one of the N bits of that word, signal points from a second sub-constellation of said PCM-derived constellation,
and
generating a signal representing the selected signal points,
said trellis encoding being independent of any of the bits of said others of said received N-bit words, and the amplitude of each of the signal points of said first sub-constellation being lower than the amplitude of any of the signal points of said second sub-constellation.

13. A method for generating a transmit signal to represent a stream of data words, the method comprising the steps of
generating a trellis encoded signal which is a function of a predetermined number of bits of each of a first plurality of said data words and using the trellis encoded signal to identify, independently of the values of other data words not in said first plurality of data words, one of a predetermined number of subsets of a predetermined sub-constellation of a PCM-derived constellation,
selecting an individual signal point of the identified subset as a function of the other bits of said each of said first plurality of said data words and independently of the values of said other data words,
selecting signal points from the remainder of said PCM-derived constellation as a function of said other data words and independently of the values of said first plurality of said data words, and
generating, as said transmit signal, a signal which represents the selected signal points.

14. The invention of claim 13 wherein said step of generating a trellis encoded signal is performed by a finite state machine whose state is advanced only upon the selection of a signal point from said predetermined sub-constellation.

15. The invention of claim 14 wherein the actual minimum distance between the signal points of said sub-constellation is less than the actual minimum distance between the signal points of said remainder of said PCM-derived constellation.

16. The invention of claim 15 wherein said step of generating a trellis encoded signal provides decibel gain in the minimum distance between the signal points of said sub-constellation which is greater than any decibel gain that the second of said selecting steps provides in the minimum distance between the signal points of said remainder of said PCM-derived constellation.

17. The invention of claims 13 or 16 wherein the amplitude of the signal points of said sub-constellation are all lower than the amplitude of any of the signal points of said remainder of said PCM-derived constellation.

18. The invention of claim 17 wherein the signal points of said PCM-derived constellation are particular PCM voice coder quantization levels.

19. The invention of claim 18 wherein said first plurality of said data words are said data words having particular bit values at one or more bit positions.

20. The invention of claim 19 wherein in the second of said selecting steps no decibel gain is provided in the minimum distance between the signal points of said remainder of said PCM-derived constellation.

21. A method for use in a receiver to which has been transmitted a signal representing a stream of signal points of a predetermined constellation, the constellation comprising at least first and second sub-constellations, the signal points having been selected from said predetermined constellation by coding the input data in such a way that a) the signal points selected from the first sub-constellation are selected independently of the selection of signal points from the second sub-constellation, and b) decibel gain is provided in the minimum distance between the signal points selected from the first sub-constellation which is greater than any decibel gain provided in the minimum distance between the signal points selected from the second sub-constellation,
the method comprising the steps of
receiving said signal, and
recovering the input data from the received signal.

22. The invention of claim 21 wherein said recovering step includes the steps of
identifying first portions of the received signal which represent signal points selected from the first sub-constellation and second portions of the received signal which represent signal points selected from the second sub-constellation,
maximum-likelihood-decoding said first portions of the received signal to recover input data represented by the signal points selected from the first sub-constellation, and
decoding said second portions of the received signal to recover input data represented by the signal points selected from the second sub-constellation.

23. A method for use in a receiver to which has been transmitted a signal representing signal points selected by the steps of
receiving, for first ones of a succession signaling intervals, respective first input words whose values meet a predetermined criterion,
receiving, for second ones of said signaling intervals, respective second input words whose values do not meet said predetermined criterion,
selecting signal points from a first one of at least two non-overlapping sub-constellations of a predetermined signal constellation, those signal points being selected as a function of the values of said first input words in such a way that decibel gain is provided in the minimum distance between the signal points of said first sub-constellation, and those signal points being selected independently of the values of any of said second input words, and selecting signal points from a second one of said sub-constellations, those signal points being selected as a function of the values of said second input words and those signal points being selected independently of the values of said first input words, the method comprising the steps of receiving said signal, and recovering the input words from the received signal.

24. The invention of claim 23 wherein said recovering step includes the steps of identifying first portions of the received signal which represent signal points selected from the first sub-constellation and second portions of the received signal which represent signal points selected from the second sub-constellation, maximum-likelihood-decoding said first portions of the received signal to recover input data represented by the signal points selected from the first sub-constellation, and decoding said second portions of the received signal to recover input data represented by the signal points selected from the second sub-constellation.

25. A method for use in a receiver to which has been transmitted over a telecommunications network a signal representing a stream of data words, the signal having been generated by the steps of generating a trellis encoded signal which is a function of a predetermined number of bits of each of a first plurality of said data words and using the trellis encoded signal to identify, independently of the values of other data words not in said first plurality of data words, one of a predetermined number of subsets of a predetermined sub-constellation of a PCM-derived constellation, selecting an individual signal point of the identified subset as a function of the other bits of said each of said first plurality of said data words and independently of the values of said other data words, selecting signal points from the remainder of said PCM-derived constellation as a function of said other data words and independently of the values of said first plurality of said data words, and generating, as said signal, a signal which represents the selected signal points, the method comprising the steps of receiving said signal, and recovering the stream of data words from the received signal.

26. The invention of claim 25 wherein said recovering step includes the steps of identifying first portions of the received signal which represent signal points selected from said predetermined sub-constellation and second portions of the received signal which represent signal points selected from said remainder of said PCM-derived constellation, maximum-likelihood-decoding said first portions of the received signal to recover input data represented by the signal points selected from said predetermined sub-constellation, and decoding said second portions of the received signal to recover input data represented by the signal points selected from said remainder of said PCM-derived constellation.

27. The invention of claims 23 or 24 wherein said decibel gain in the minimum distance between the signal points selected from the first sub-constellation is greater than any decibel gain provided, in the second of said selecting steps, in the minimum distance between the signal points selected from the second sub-constellation.

28. The invention of claims 25 or 26 wherein the amplitude of the signal points of said sub-constellation are all lower than the amplitude of any of the signal points of said remainder of said PCM-derived constellation.

29. The invention of any one of claims 21 through 26 wherein the signal points of the predetermined constellation are particular mu-law or A-law coder quantization levels.

30. The invention of claims 22, 24, or 26 comprising the further step of assembling the input data recovered in said maximum-likelihood-decoding and said decoding steps into their original order, said assembling step including the step of selectively varying the decoding depth of said maximum-likelihood-decoding.

31. The invention of claims 21 or 22, wherein said first and second sub-constellations are non-overlapping.

32. The invention of claims 21 or 22 wherein said first sub-constellation decibel gain is provided by the steps of applying a predetermined redundancy code to portions of the input data, and using the resulting redundancy encoded data to select signal points exclusively from the first sub-constellation.

33. The invention of claim 21 wherein said input data is arranged in data words and wherein said first sub-constellation decibel gain is provided by the steps of trellis encoding a portion of each of a first plurality of data words to identify a particular one of a plurality of subsets of the first sub-constellation, and using the remainder of said each of said first plurality of data words to select a particular signal point from the identified subset.

34. The invention of claims 21 or 22 wherein a particular sub-constellation that a particular signal point in the stream of signal points is selected from is determined in response to at least a portion of the input data.

35. The invention of claim 34 wherein the input data comprises a sequence of multibit words, wherein the value of at least one of the bits of each multibit word identifies said particular sub-constellation and wherein at least the other bits of said each multibit word are used to select said particular signal point.

36. The invention of claims 21 or 22 wherein the actual minimum distance between the signal points of the first sub-constellation is smaller than the actual minimum distance between the signal points of the second sub-constellation.

37. The invention of claims 21 or 22 wherein the signal points of the first sub-constellation are all of lower amplitude than any of the signal points of the second sub-constellation.

38. The invention of claim 21 wherein the predetermined constellation comprises only said first and second sub-constellations and wherein the input data is coded in such a way that decibel gain is provided only in the minimum distance between the signal points selected from the first sub-constellation.

39. The invention of claim 27 wherein the actual minimum distance between the signal points of said first sub-constellation is smaller than the actual minimum distance between the signal points of said second sub-constellation.

40. The invention of claim 39 wherein the actual minimum distance between the signal points of each subset is greater than the actual minimum distance between the signal points of the first sub-constellation.

41. The invention of claim 40 wherein said values of said input words which meet a predetermined criterion are values having particular values in one or more predetermined bit positions.

42. The invention of claim 28 wherein the signal points of said PCM-derived constellation are particular PCM voice coder quantization levels.

43. The invention of claim 42 wherein said first plurality of said data words are said data words having particular bit values at one or more bit positions.

44. The invention of claim 43 wherein in the second of said selecting steps no decibel gain is provided in the minimum distance between the signal points of said remainder of said PCM-derived constellation.

45. Apparatus comprising
   modulation circuitry which, in response to input data, selects a stream of signal points of a predetermined constellation, the constellation comprising at least first and second sub-constellations, and
   circuitry which generates an output signal representing the selected stream of signal points,
   the modulation circuitry including circuitry which encodes the input data in such a way that a) the signal points selected from the first sub-constellation are selected independently of the selection of signal points from the second sub-constellation, and b) decibel gain is provided in the minimum distance between the signal points selected from the first sub-constellation which is greater than any decibel gain provided in the minimum distance between the signal points selected from the second sub-constellation.

46. The invention of claim 45 wherein said first and second sub-constellations are non-overlapping.

47. The invention of claim 46 wherein said encoding circuitry includes circuitry which provides said first sub-constellation decibel gain by applying a predetermined redundancy code to portions of the input data and using the resulting redundancy encoded data to select signal points exclusively from the first sub-constellation.

48. The invention of claim 47 wherein said input data is arranged in data words and wherein said encoding circuitry includes circuitry which provides said first sub-constellation decibel gain by utilizing a trellis encoded signal which is a function of a portion of each of a first plurality of data words to identify a particular one of a plurality of subsets of the first sub-constellation, and using the remainder of said each of said first plurality of data words to select a particular signal point from the identified subset.

49. The invention of claim 48 wherein the actual minimum distance between the signal points of each of said subsets is greater than the actual minimum distance between the signal points of the first sub-constellation.

50. The invention of claim 45 wherein a particular sub-constellation that a particular signal point in the stream of signal points is selected from is determined in response to at least a portion of the input data.

51. The invention of claim 50 wherein the input data comprises a sequence of multibit words, wherein the value of at least one of the bits of each multibit word identifies said particular sub-constellation and wherein at least the other bits of said each multibit word are used to select said particular signal point.

52. The invention of claims 46 or 51 wherein the signal points of the predetermined constellation are particular mu-law or A-law coder quantization levels.

53. The invention of claim 45 wherein the actual minimum distance between the signal points of the first sub-constellation is smaller than the actual minimum distance between the signal points of the second sub-constellation.

54. The invention of claim 53 wherein the signal points of the first sub-constellation are all of lower amplitude than any of the signal points of the second sub-constellation.

55. The invention of claim 54 wherein the predetermined constellation comprises only said first and second sub-constellations and wherein the input data is encoded in such a way that decibel gain is provided only in the minimum distance between the signal points selected from the first sub-constellation.

56. Apparatus comprising
   a) means for receiving a stream of binary input data,
   b) means for forming said data into words of predetermined length,
   c) means operative only when an individual one of said words has one of a particular group of values for
      i) redundancy encoding at least certain bits of said individual one of said words to identify one of a plurality of subsets of signal points of a first sub-constellation of a predetermined signal point constellation, and
      ii) using other bits of said individual one of said words to select a particular signal point from the identified subset,
   and operative only otherwise for using at least certain bits of said individual one of said words to select a particular signal point from a second sub-constellation of said predetermined signal point constellation, and
   d) means for generating an output signal representing the selected signal points,
   said means c) being such that decibel gain is provided in the minimum distance between the signal points selected from the first sub-constellation which is greater than any decibel gain provided in the minimum distance between the signal points selected from the second sub-constellation.

57. The invention of claim 56 wherein said first and second sub-constellation are non-overlapping.

58. The invention of claim 56 wherein the signal points of the first sub-constellation are all of lower amplitude than any of the signal points of the second sub-constellation.

59. The invention of claim 58 wherein the actual minimum distance between the signal points of each subset is greater than the actual minimum distance between the signal points of the first sub-constellation.

60. The invention of claim 59 wherein said particular group of values of said words are values having particular values in one or more predetermined bit positions.

61. The invention of claim 60 wherein the actual minimum distance between the signal points of the first sub-constellation is smaller than the actual minimum distance between the signal points of the second sub-constellation.

62. The invention of claims 56 or 61 wherein the signal points of the constellation are particular PCM coder quantization levels.

63. Apparatus comprising
   means for receiving, for first ones of a succession signaling intervals, respective first input words whose values meet a predetermined criterion, and for second ones of said signaling intervals, respective second input words whose values do not meet said predetermined criterion,
   means for selecting signal points from a first one of at least two non-overlapping sub-constellations of a predetermined signal constellation, those signal points being selected as a function of the values of said first input words in such a way that decibel gain is provided in the minimum distance between the signal points of said first sub-constellation, and those signal points being selected independently of the values of any of said second input words, and for selecting signal points from a second one of said sub-constellations, those signal points being selected as a function of the values of said second input words and those signal points being selected independently of the values of said first input words, and means for generating a transmit signal representing the signal points thus selected.

64. The invention of claim 63 wherein said decibel gain in the minimum distance between the signal points selected from the first sub-constellation is greater than any decibel gain provided, in the second of said selecting steps, in the minimum distance between the signal points selected from the second sub-constellation.

65. The invention of claim 64 wherein the actual minimum distance between the signal points of said first sub-constellation is smaller than the actual minimum distance between the signal points of said second sub-constellation.

66. The invention of claim 65 wherein in the first of said selecting steps said first input words are encoded using a finite state machine whose state is advanced in response only to receipt of said first input words.

67. The invention of claim 66 wherein said finite state machine implements a predetermined trellis code.

68. A receiver for processing a signal transmitted thereto, the signal representing a stream of signal points of a predetermined constellation, the constellation comprising at least first and second sub-constellations, the signal points having been selected from said predetermined constellation by coding the input data in such a way that a) the signal points selected from the first sub-constellation are selected independently of the selection of signal points from the second sub-constellation, and b) decibel gain is provided in the minimum distance between the signal points selected from the first sub-constellation which is greater than any decibel gain provided in the minimum distance between the signal points selected from the second sub-constellation, the receiver including means for receiving said signal, and means for recovering the input data from the received signal.

69. The invention of claim 68 wherein said recovering means includes means for identifying first portions of the received signal which represent signal points selected from the first sub-constellation and second portions of the received signal which represent signal points selected from the second sub-constellation, means for maximum-likelihood-decoding said first portions of the received signal to recover input data represented by the signal points selected from the first sub-constellation, and means for decoding said second portions of the received signal to recover input data represented by the signal points selected from the second sub-constellation.

70. Receiver apparatus for processing a signal representing signal points that were selected from a predetermined signal point constellation by the steps of a) receiving a stream of binary input data, b) forming said data into words of predetermined length, c) only when an individual one of said has one of a particular group of values, performing the steps of i) redundancy encoding at least certain bits of said individual one of said words to identify one of a plurality of subsets of signal points of a first sub-constellation of said predetermined signal point constellation, and ii) using other bits of said individual one of said words to select a particular signal point from the identified subset, and only otherwise using at least certain bits of said individual one of said words to select a particular signal point from a second sub-constellation of said predetermined signal point constellation, said step c) being such that decibel gain is provided in the minimum distance between the signal points selected from the first sub-constellation which is greater than any decibel gain provided in the minimum distance between the signal points elected from the second sub-constellation, the apparatus comprising circuitry adapted to receive said signal, and circuitry adapted to recover the input data from the received signal.

71. The invention of claim 70 wherein said recovering circuitry includes circuitry adapted to identify first portions of the received signal which represent signal points selected from the first sub-constellation and second portions of the received signal which represent signal points selected from the second sub-constellation, maximum-likelihood-decode said first portions of the received signal to recover input data represented by the signal points selected from the first sub-constellation, and decode said second portions of the received signal to recover input data represented by the signal points selected from the second sub-constellation.

72. The invention of claims 68, 69, 70 or 71 wherein said first and second sub-constellations are non-overlapping.

73. The invention of claims 68 or 69 wherein said first sub-constellation decibel gain is provided by the steps of applying a predetermined redundancy code to portions of the input data, and using the resulting redundancy encoded data to select signal points exclusively from the first sub-constellation.

74. The invention of claims 68 or 69 wherein said input data is arranged in data words and wherein said first sub-constellation decibel gain is provided by the steps of trellis encoding a portion of each of a first plurality of data words to identify a particular one of a plurality of subsets of the first sub-constellation, and using the remainder of said each of said first plurality of data words to select a particular signal point from the identified subset.

75. The invention of claim 70 wherein the actual minimum distance between the signal points of each of said subsets is greater than the actual minimum distance between the signal points of the first sub-constellation.

76. The invention of claims 68 or 69 wherein a particular sub-constellation that a particular signal point in the stream of signal points is selected from is determined in response to at least a portion of the input data.

77. The invention of claim 76 wherein the input data comprises a sequence of multibit words, wherein the value of at least one of the bits of each multibit word identifies said particular sub-constellation and wherein at least the other bits of said each multibit word are used to select said particular signal point.

78. The invention of claims 68 or 69 wherein the actual minimum distance between the signal points of the first sub-constellation is smaller than the actual minimum distance between the signal points of the second sub-constellation.

79. The invention of claims 68, 69, 70, or 71 wherein the signal points of the first sub-constellation are all of lower amplitude than any of the signal points of the second sub-constellation.

80. The invention of claims 68 or 69 wherein the predetermined constellation comprises only said first and second sub-constellations and wherein the input data is coded in such a way that decibel gain is provided only in the minimum distance between the signal points selected from the first sub-constellation.

81. The invention of any one of claims 68 through 71 wherein the signal points of the predetermined constellation are particular mu-law or A-law coder quantization levels.

82. The invention of claim 81 wherein the actual minimum distance between the signal points of the first sub-constellation is smaller than the actual minimum distance between the signal points of the second sub-constellation.

* * * * *